US012675946B2

(12) United States Patent
Zhu et al.

(10) Patent No.: US 12,675,946 B2
(45) Date of Patent: Jul. 7, 2026

(54) SHADOW RENDERING METHOD AND APPARATUS, ELECTRONIC DEVICE, AND READABLE STORAGE MEDIUM

(71) Applicant: Tencent Technology (Shenzhen) Company Limited, Shenzhen (CN)

(72) Inventors: Hongchuan Zhu, Shenzhen (CN); Wei Yao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 139 days.

(21) Appl. No.: 18/885,221

(22) Filed: Sep. 13, 2024

(65) Prior Publication Data

US 2025/0014268 A1     Jan. 9, 2025

Related U.S. Application Data

(63) Continuation of application No. PCT/CN2023/123331, filed on Oct. 8, 2023.

(30) Foreign Application Priority Data

Nov. 3, 2022     (CN) .......................... 202211368766.6

(51) Int. Cl.
    *G06T 15/60*     (2006.01)
    *G06T 7/50*     (2017.01)
(52) U.S. Cl.
    CPC ................ *G06T 15/60* (2013.01); *G06T 7/50* (2017.01); *G06T 2207/10028* (2013.01); *G06T 2215/12* (2013.01)
(58) Field of Classification Search
    CPC . G06T 15/60; G06T 7/50; G06T 2207/10028; G06T 2215/12; G06T 15/005; G06T 15/80; A63F 13/52
    See application file for complete search history.

(56) References Cited

U.S. PATENT DOCUMENTS

| | | | |
|---|---|---|---|
| 11,232,628 B1* | 1/2022 | Hillman ................. | G06T 19/20 |
| 2016/0063757 A1* | 3/2016 | Yang ...................... | G06T 15/60 |
| | | | 345/426 |

(Continued)

FOREIGN PATENT DOCUMENTS

| | | |
|---|---|---|
| CN | 111105491 A | 5/2020 |
| CN | 112215936 A | 1/2021 |
| CN | 113256781 A | 8/2021 |

OTHER PUBLICATIONS

Tencent Technology, WO+IPRP, PCT/CN2023/123331, Apr. 29, 2025, 5 pgs.

(Continued)

*Primary Examiner* — Amit Chatly
(74) *Attorney, Agent, or Firm* — Morgan, Lewis & Bockius LLP

(57)     ABSTRACT

A shadow rendering method is performed by an electronic device. The method includes: determining scene ranges corresponding to a plurality of first levels, each scene range being a first visible scene range of a virtual scene corresponding to a respective one of the plurality of first levels; for a respective one of the plurality of first levels: determining a first virtual item whose shadow is present in a first visible scene range corresponding to the first level; determining a first projection depth map corresponding to the first level based on the first virtual item, the first projection depth map being configured for describing distances between a light source and a plurality of first vertices on a surface of the first virtual item facing the light source; and rendering the shadow of the first virtual item in the first visible scene range based on the first projection depth map.

17 Claims, 8 Drawing Sheets

(56)     References Cited

U.S. PATENT DOCUMENTS

2018/0276878 A1     9/2018   Bunnell
2021/0279948 A1*    9/2021   Hou ........................ G06T 15/04

OTHER PUBLICATIONS

Tencent Technology, Extended European Search Report, EP Patent Application No. 23884542.4, Jan. 12, 2026, 12 pgs.
Markus Giegl et al., "Fitted Virtual Shadow Maps", GI '07: Proceedings of Graphics Interface, May 28-30, 2007, Montreal, Canada, May 2007, 10 pgs.
Tencent Technology, ISR, PCT/CN2023/123331, Jan. 3, 2024, 2 pgs.

* cited by examiner

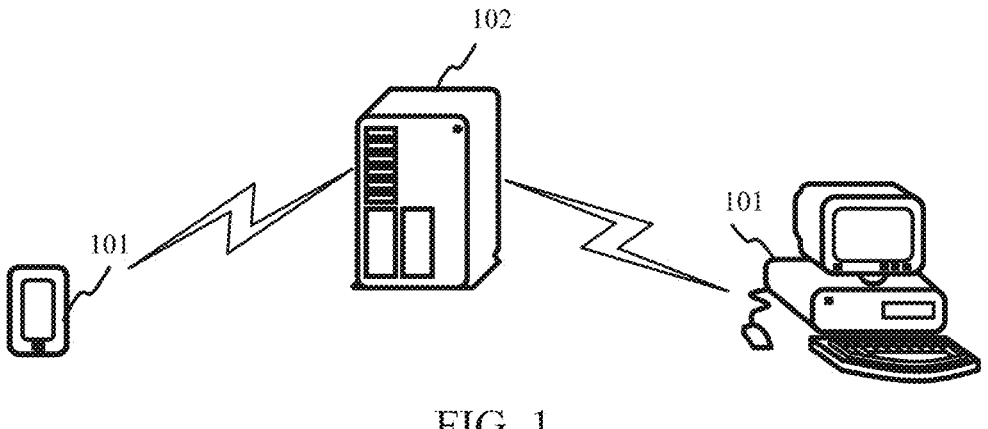

FIG. 1

| |
| --- |
| Determine scene ranges corresponding to a plurality of first levels, the scene range corresponding to the first level being a range of a first visible scene included in a virtual scene or a partial range of the first visible scene |

201

| |
| --- |
| Determine, for any one of the plurality of first levels, a first virtual item corresponding to the first level based on a scene range corresponding to the first level, the first virtual item being a virtual item whose shadow is in the scene range corresponding to the first level |

202

| |
| --- |
| Determine a first projection depth map corresponding to the first level based on the first virtual item, the first projection depth map being configured for describing distances between a plurality of first vertices and a light source, the plurality of first vertices being each a vertex on a surface of the first virtual item facing the light source |

203

| |
| --- |
| Render the shadow in the first visible scene based on the first projection depth map |

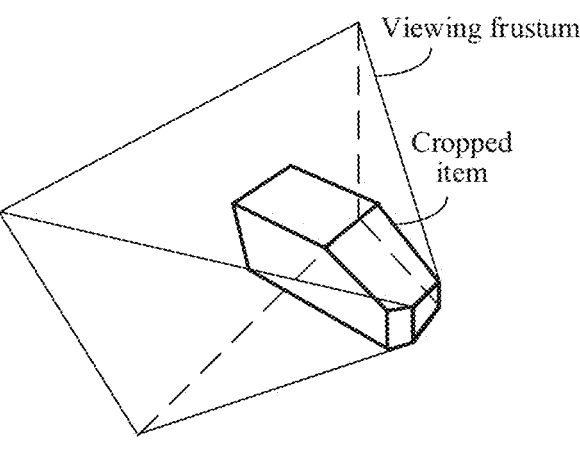

Viewing frustum

Cropped item

Projection of a bounding box of a virtual item       Bounding frame of the projection of the bounding box of the virtual item One projection depth map in the map set Map set Projection depth values at a start point and an end point of an arrow are the same First map set First visible scene Shadow

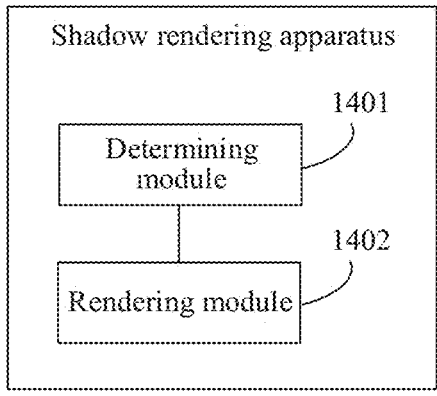
FIG. 14
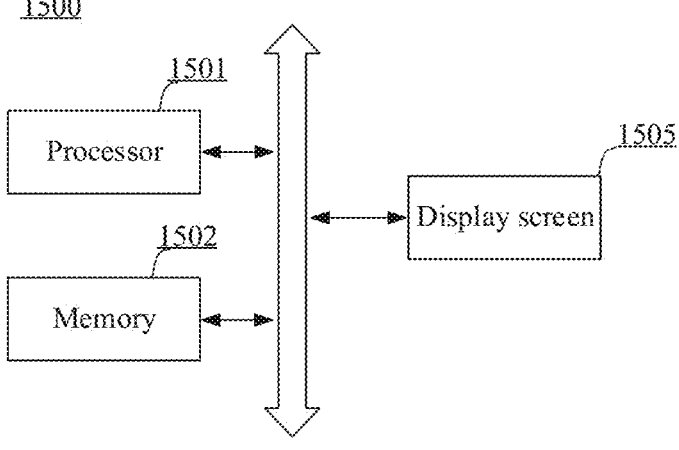
FIG. 15
Server 1600
Processor — 1601
Memory — 1602
FIG. 16

SHADOW RENDERING METHOD AND APPARATUS, ELECTRONIC DEVICE, AND READABLE STORAGE MEDIUM

CROSS-REFERENCE TO RELATED APPLICATIONS

This application is a continuation application of PCT Patent Application No. PCT/CN2023/123331, entitled "SHADOW RENDERING METHOD AND APPARATUS, ELECTRONIC DEVICE, AND READABLE STORAGE MEDIUM" filed on Oct. 8, 2023, which claims priority to Chinese Patent Application No. 202211368766.6, entitled "SHADOW RENDERING METHOD AND APPARATUS, ELECTRONIC DEVICE, AND READABLE STORAGE MEDIUM" filed on Nov. 3, 2022, both of which are incorporated herein by reference in their entirety.

FIELD OF THE TECHNOLOGY

Embodiments of this application relate to the field of image rendering technologies, and in particular, to a shadow rendering method and apparatus, an electronic device, and a readable storage medium.

BACKGROUND OF THE DISCLOSURE

Industries such as movies and games have higher requirements on image rendering technologies. Not only is it expected that a virtual item is rendered in a virtual scene, but it is also expected that a shadow of the virtual item is rendered in the virtual scene, thereby improving fidelity of the virtual scene under a light condition.

In the related art, a shadow of a virtual item needs to be baked under different light conditions in advance, and the shadow of the virtual item is stored in a form of an image. The image may be referred to as a shadow map of the virtual item. Shadow maps of virtual items may be stored on a magnetic disk. When a shadow of a specific virtual item needs to be rendered, a shadow map of the virtual item may be read from the magnetic disk, and the shadow map of the virtual item is loaded to render the shadow of the virtual item in the virtual scene.

SUMMARY

This application provides a shadow rendering method and apparatus, an electronic device, and a readable storage medium, to reduce occupation of storage resources, and improve a presentation effect of a shadow and fidelity of a virtual scene. The technical solutions include the following content.

According to an aspect, a shadow rendering method is performed by an electronic device, and the method includes:

determining scene ranges corresponding to a plurality of first levels, each scene range being a first visible scene range of a virtual scene corresponding to a respective one of the plurality of first levels;

for a respective one of the plurality of first levels: determining a first virtual item whose shadow is present in a first visible scene range corresponding to the first level;

determining a first projection depth map corresponding to the first level based on the first virtual item, the first projection depth map being configured for describing distances between a light source and a plurality of first vertices on a surface of the first virtual item facing the light source; and rendering the shadow of the first virtual item in the first visible scene range based on the first projection depth map.

According to another aspect, an electronic device is provided, including a processor and a memory, the memory storing at least one computer program, and the at least one computer program being loaded and executed by the processor, to cause the electronic device to implement the shadow rendering method according to any one of the foregoing aspects.

According to another aspect, a non-transitory computer-readable storage medium is provided, having at least one computer program stored therein, and the at least one computer program being loaded and executed by a processor of an electronic device, to cause the electronic device to implement the shadow rendering method according to any one of the foregoing aspects.

According to another aspect, a computer program is provided, there being at least one computer program, and the at least one computer program being loaded and executed by a processor, to cause an electronic device to implement any foregoing shadow rendering method.

According to another aspect, a computer program product is provided, having at least one computer program stored therein, and the at least one computer program being loaded and executed by a processor, to cause an electronic device to implement any foregoing shadow rendering method.

In the technical solutions provided in this application, the scene range corresponding to the first level is a range of a first visible scene included in a virtual scene or a partial range of the first visible scene, which is equivalent to determining the scene range corresponding to the first level according to the first visible scene in real time during running of the virtual scene. The first virtual item corresponding to the first level is determined based on the scene range corresponding to the first level, to determine the projection depth map corresponding to the first level based on the first virtual item corresponding to the first level, so that during running of the virtual scene, projection depth maps corresponding to a global range and the partial range of the first visible scene are determined in real time. In comparison with determining and storing shadow maps of the virtual items in the virtual scene, this solution can reduce occupation of storage resources. Shadows in the first visible scene are rendered based on the projection depth maps corresponding to the global range and the partial range of the first visible scene. In this way, while the shadows are updated in real time, it is further beneficial to improving a presentation effect of the shadows and improving fidelity of the virtual scene.

BRIEF DESCRIPTION OF THE DRAWINGS

FIG. 1 is a schematic diagram of an implementation environment of a shadow rendering method according to an embodiment of this application.

FIG. 2 is a flowchart of a shadow rendering method according to an embodiment of this application.

FIG. 3 is a schematic diagram of a viewing frustum according to an embodiment of this application.

FIG. 14 is a schematic structural diagram of a shadow rendering apparatus according to an embodiment of this application.

FIG. 15 is a schematic structural diagram of a terminal device according to an embodiment of this application.

FIG. 16 is a schematic structural diagram of a server according to an embodiment of this application.

DESCRIPTION OF EMBODIMENTS

Figure 4:
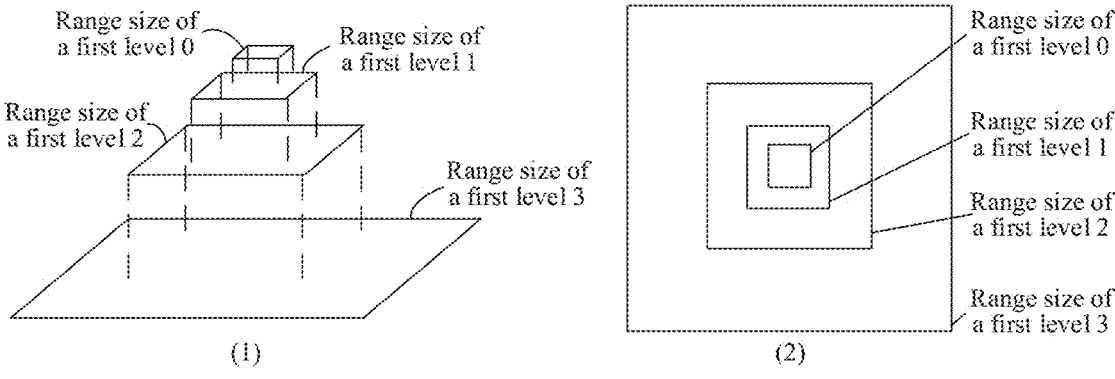
FIG. 4 is a schematic diagram of a first level according to an embodiment of this application.

To make objectives, technical solutions, and advantages of this application clearer, the following further describes implementations of this application in detail with reference to the accompanying drawings.

FIG. 1 is a schematic diagram of an implementation environment of a shadow rendering method according to an embodiment of this application. As shown in FIG. 1, the implementation environment includes a terminal device 101 and a server 102. The shadow rendering method in this embodiment of this application may be performed by the terminal device 101, or may be performed by the server 102, or may be performed jointly by the terminal device 101 and the server 102.

The terminal device 101 may be a smartphone, a game console, a desktop computer, a tablet computer, a laptop portable computer, a smart television, a smart in-vehicle device, a smart voice interaction device, a smart home appliance, or the like. The server 102 may be one server, a server cluster formed by a plurality of servers, or any one of a cloud computing center or a virtualization center. This is not limited in this embodiment of this application. The server 102 may perform communication connection with the terminal device 101 through a wired network or a wireless network. The server 102 may have functions of data processing, data storage, data transmission and reception, and the like. This is not limited in this embodiment of this application. Quantity of terminal devices 101 and servers 102 are not limited, and there may be one or more terminal devices 101 and one or more servers 102.

With the continuous development of image rendering technologies, various industries have higher requirements on the image rendering technologies. When a virtual scene in a light condition is rendered, not only is a virtual item required to be rendered, but a shadow of the virtual item is also required to be rendered, to improve fidelity of the virtual scene.

In the related art, shadow maps of all virtual items in the virtual scene need to be pre-determined, and the shadow maps of the virtual items need to be stored on a disk. When a shadow of a specific virtual item needs to be rendered, a shadow map of the virtual item is read from the magnetic disk, and the shadow map of the virtual item is loaded to render the shadow of the virtual item in the virtual scene.

Because there are a huge quantity of virtual items, a large quantity of storage resources are required to store shadow maps of the virtual items, resulting in large occupation of the storage resources.

An embodiment of this application provides a shadow rendering method. The method may be applied to the foregoing implementation environment, which can reduce occupation of storage resources and improve a shadow presentation effect in a visible scene. A flowchart of a shadow rendering method according to an embodiment of this application shown in FIG. 2 is used as an example. For ease of description, the terminal device 101 or the server 102 that performs the shadow rendering method in the embodiments of this application is referred to as an electronic device. The method may be performed by the electronic device. As shown in FIG. 2, the method includes the following operations.

Operation 201: Determine scene ranges corresponding to a plurality of first levels, the scene range corresponding to the first level being a range of a first visible scene included in a virtual scene or a partial range of the first visible scene.

For ease of understanding of Operation 201, technical terms involved are first explained and described below.

The virtual scene is a scene established using a three-dimensional modeling technology, and is applicable to a plurality of industries. For example, in the game industry, a game map including items such as a tree, a house, a lake, a cliff, and the like is usually established using the three-dimensional modeling technology. The game map is a virtual scene. For another example, in the indoor design industry, an indoor scene including items such as a desk, a wardrobe, an appliance, and a kitchenware may be established using the three-dimensional modeling technology. The indoor scene is also a virtual scene.

Generally, the electronic device does not display a complete virtual scene, but displays a part of the virtual scene. The part of the virtual scene displayed by the electronic device is referred to as a visible scene. The visible scene is a part of the virtual scene located within a viewing frustum when the virtual scene is captured by using a camera.

The viewing frustum is a cone range of a visual region with a coordinate origin as an optical center in a camera coordinate system, and has a total of six surfaces: an upper surface, a lower surface, a left surface, a right surface, a proximal surface, and a distal surface. An item located within the viewing frustum is an item that can be captured by the camera, and an item located outside the viewing frustum is an item that cannot be captured by the camera. The electronic device may crop out items located outside the viewing frustum, and render only items located within the viewing frustum. When an item is cropped, the entire item may be cropped out, or a part of the item may be cropped out. By cropping out items located outside the viewing frustum, content that needs to be rendered is reduced, and rendering performance is improved.

Referring to FIG. 3, FIG. 3 is a schematic diagram of a viewing frustum according to an embodiment of this application. As shown in FIG. 3, the viewing frustum is a cone range having a total of six surfaces. A part of the item outside the viewing frustum is cropped out, to obtain a cropped item, and the cropped item is within the viewing frustum.

Generally, when shadows in a visible scene are updated, the shadows in the visible scene need to be re-rendered. For example, when a direction of a light source that illuminates the visible scene changes, the shadows in the visible scene are updated accordingly. In this case, the shadows in the visible scene need to be re-rendered. In a possible implementation, the visible scene and the shadows in the visible scene are updated together. For example, when the visible scene changes, because different virtual items exist in different visible scenes, the shadows in the visible scene also need to change. To distinguish between the visible scene before the shadow update and the visible scene after the shadow update, the visible scene after the shadow update is denoted as a first visible scene, and the visible scene before the shadow update is denoted as a second visible scene.

When the visible scene needs to be updated, the first visible scene and the second visible scene are different, and shadows in the first visible scene are different from shadows in the second visible scene. When the visible scene does not need to be updated, the first visible scene and the second visible scene are the same, but the shadows in the first visible scene and the shadows in the second visible scene may be different.

The electronic device needs to obtain scene ranges corresponding to a plurality of first levels obtained by dividing the first visible scene. One first level corresponds to one scene range. There are a plurality of first levels and a plurality of scene ranges. In this case, a scene range corresponding to any first level is a range of the first visible scene or a range of a partial scene in the first visible scene. The level may alternatively be referred to as a layer or a tier. The level may be represented by a range size, in other words, the level may be divided based on the range size. Different levels have different range sizes, but center points (or center of gravity points) may be the same. An example is used in which a range size of the first level is X. The scene range corresponding to the first level is a scene range with the range size X. This embodiment of this application is not limited to the division manner of the first visible scene. For example, the first visible scene is divided according to implementation A1 or implementation A2.

A center point of a level is a geometric center of a scene range corresponding to the level, and a center of gravity point of a level is a point exerted by gravity on the scene range corresponding to the level. Manners of determining the center point of the level and the center of gravity point of the level are not limited in this embodiment of this application. All embodiments of this application are applicable to both the center point and the center of gravity point, that is, the two may be interchanged in all embodiments.

In implementation A1, Operation 201 includes: evenly dividing the first visible scene into a plurality of partial scenes with the same area and same shape, where a range of one partial scene or a range of the first visible scene is the scene range corresponding to the first level.

In implementation A2, Operation 201 includes: obtaining range sizes of the first levels; and determining, for any first level, a scene range corresponding to the first level in the first visible scene based on a reference point of the first visible scene and the range size of the first level.

In this embodiment of this application, the plurality of first levels may be considered as levels having an upper-lower level relationship. A range size of an upper first level in the plurality of first levels is smaller than a range size of a lower first level. A position of a virtual object in the first visible scene may be used as the reference point of the first visible scene, or a center point, a center of gravity point, or the like of the first visible scene may be used as the reference point of the first visible scene. The reference point of the first visible scene is used as the center point or the center of gravity point of the first level. The first visible scene is divided based on the range size of the first level. A range of a partial scene obtained through division is the scene range corresponding to the first level.

For example, a scene range corresponding to the $1^{st}$ first level is a scene range with the position of the virtual object as the center and a side length of 32 meters, a scene range corresponding to the $2^{nd}$ first level is a scene range with the position of the virtual object as the center and a side length of 64 meters, and so on.

The electronic device may store the scene ranges corresponding to the first levels. In some embodiments, for any first level, the electronic device may store a center point (or a center of gravity point) of a scene range corresponding to the first level and a range size of the first level. When the scene range corresponding to the first level is a rectangle, the electronic device may store coordinates of points of the rectangle, or the electronic device may store four boundaries of the rectangle (storage codes are as follows), to store the scene range corresponding to the first level.

```
Rect
{
float xMin; //left boundary of the rectangle
float yMax; //upper boundary of the rectangle
float xMax; //right boundary of the rectangle
float yMin; //lower boundary of the rectangle
}
```

In some embodiments, the center points of the first levels are all reference points of the first visible scene. Therefore, the center points of the first levels are the same. Alternatively, the center of gravity points of the first levels are all reference points of the first visible scene. Therefore, the center of gravity points of the first levels are the same. Because the range size of the upper first level is smaller than the range size of the lower first level, scene ranges corresponding to the plurality of first levels may be considered as a set of scene ranges with gradually increasing range sizes.

In some embodiments, a Clipmap refers to a set of data having a same center point or a same center of gravity point, but whose coverage area is doubled level by level. The data includes but is not limited to the map. For example, the data may be a partial scene of the virtual scene. When the range size of the lower first level is twice the range size of the upper first level, in this case, the scene ranges corresponding to the plurality of first levels are a group of scenes with the same center point or the same center of gravity point, and whose range sizes are doubled level by level. Based on this, the scene ranges corresponding to the first levels are also referred to as the Clipmap.

Referring to FIG. 4, FIG. 4 is a schematic diagram of a first level according to an embodiment of this application. (1) in FIG. 4 shows range sizes of a first level 0 to a first level 3 with an upper-lower level relationship. A range size of an upper first level is smaller than a range size of a lower first level. (2) in FIG. 4 shows a top view of range sizes of the first level 0 to the first level 3. Four range sizes from inside to outside are the range sizes from the first level 0 to the first level 3 respectively.

In a possible implementation, Operation 201 includes: determining the scene ranges corresponding to the plurality of first levels in response to a shadow update condition being satisfied, where the shadow update condition being satisfied includes at least one of Case B1 to Case B3.

Case B1: A virtual object moves in a virtual scene.

The virtual object is an object modeled using the three-dimensional modeling technology. A figure and the like of the virtual object is not limited in this embodiment of this application. For example, the virtual object may be in a human form, an animal form, a cartoon form, or the like. The virtual object may be controlled by a user or a computer program. For example, in a game scene, a game character is controlled by a user, and game monsters are controlled by computer programs. Both the game character and the game monsters are virtual objects.

When the electronic device determines that the virtual object moves in the virtual scene, the electronic device determines that the shadow update condition is satisfied. In this case, a shadow in the visible scene needs to be updated. In a possible implementation, when the virtual object moves in the virtual scene, the visible scene is updated with the movement of the virtual object, causing the shadow in the visible scene to be updated accordingly.

In some embodiments, before Operation 201, the following operations may be further performed: obtaining movement information of a virtual object and scene ranges corresponding to a plurality of second levels when the virtual object moves in the virtual scene, the scene range corresponding to the second level being a range of a second visible scene included in the virtual scene or a partial range in the second visible scene, the first visible scene being a visible scene after the virtual object moves, and the second visible scene being a visible scene before the virtual object moves; determining, for any second level, a second movement amplitude of the virtual object relative to the second level based on the movement information of the virtual object and a scene range corresponding to the second level; and determining, in response to existence of a target level in the plurality of second levels, that the shadow update condition is satisfied, a target movement amplitude of the virtual object relative to the target level being greater than a movement threshold.

When the electronic device determines that the virtual object moves in the virtual scene, the electronic device may obtain the movement information of the virtual object. In some embodiments, the movement information of the virtual object is a trajectory on which the virtual object moves, including a plurality of trajectory points. Any trajectory point corresponds to one three-dimensional coordinate and one time point. The three-dimensional coordinate of the trajectory point represents a position of the trajectory point in the virtual scene, and the time of the trajectory point represents a time when the virtual object reaches the trajectory point. Alternatively, the movement information of the virtual object includes at least one of a movement start point, a movement direction, a movement distance, a movement end point, and the like.

In this embodiment of this application, the visible scene may be updated as the virtual object moves. The visible scene before the virtual object moves is the visible scene before the update, which is also referred to as the second visible scene. The visible scene after the virtual object moves is an updated visible scene, which is also referred to as the first visible scene.

The second visible scene is divided into scene ranges corresponding to a plurality of second levels. One second level corresponds to one scene range. There are a plurality of second levels, and there are a plurality of scene ranges. The electronic device may directly obtain the scene ranges corresponding to the second levels. Content of a scene range corresponding to any second level is similar to content of the scene range corresponding to any first level. Refer to descriptions of implementations A1 and A2. Details are not described herein again.

The plurality of first levels include a first level with the same range size as any second level. In other words, range sizes of the plurality of first levels having the upper-lower level relationship sequentially correspond to range sizes of the plurality of second levels having the upper-lower level relationship, and each of the plurality of first levels has the same range size as a second level corresponding to the first level.

In this embodiment of this application, the movement distance of the virtual object may be determined based on the movement information of the virtual object. For example, the movement distance of the virtual object is determined based on the first trajectory point and the last trajectory point in the plurality of trajectory points included in the movement trajectory of the virtual object, or the movement distance of the virtual object is extracted from the movement information of the virtual object. Then, a ratio between the movement distance of the virtual object and a range size of a scene range corresponding to any second level may be calculated, and the ratio is used as a movement amplitude of the virtual object relative to the second level. If the target level exists in the plurality of second levels, and a movement amplitude of the virtual object relative to the target level is greater than the movement threshold, the electronic device determines that the shadow update condition is satisfied.

For ease of description, the movement amplitude of the virtual object relative to the second level is referred to as the second movement amplitude for short, and the movement amplitude of the virtual object relative to the target level is referred to as the target movement amplitude for short. That is, the electronic device may determine a plurality of second movement amplitudes. If a second movement amplitude is greater than the movement threshold, a second level corresponding to the second movement amplitude is the target level, and the second movement amplitude is the target movement amplitude. If the target level exists, the electronic device determines that the shadow update condition is satisfied. That is, if the second movement amplitude is greater than the movement threshold, the electronic device determines that the shadow update condition is satisfied.

Content of the movement threshold is not limited in this embodiment of this application. For example, the movement threshold is manually determined data. Because the second movement amplitude is a ratio between the movement distance of the virtual object and the range size of the scene range corresponding to the second level, the movement threshold is also a ratio. For example, the movement threshold is 10%.

Case B2: Illumination of the virtual scene changes.

When light is irradiated on an opaque item, because the item blocks propagation of the light, the light cannot pass through the item to form a shadow region. It can be learned from the principle that the shadow is closely related to the light. When the illumination of the virtual scene changes, the electronic device may determine that the shadow update condition is satisfied. The change in the illumination of the virtual scene includes a change in a direction of the illumination in the virtual scene, a change in a distance between the illumination and the virtual item in the virtual scene, and the like. For example, changing a point light source into parallel light causes the illumination direction to change, or the distance between the point light source and the virtual item in the virtual scene becomes smaller.

Case B3: The virtual scene is initialized.

In the method provided in the embodiments of this application, initializing the virtual scene may be setting the virtual scene to a scene in a default state. For example, when a game starts, the electronic device may initialize the virtual scene. When the virtual scene is initialized, because the virtual item, the shadow of the virtual item, and the like in the virtual scene need to be rendered, the electronic device may determine that the shadow update condition is satisfied.

Operation 202: Determine, for any one of the plurality of first levels, a first virtual item corresponding to the first level based on a scene range corresponding to the first level, the first virtual item being a virtual item whose shadow is in the scene range corresponding to the first level.

In this embodiment of this application, because light rays have a straight propagation characteristic, when the light rays encounter an opaque virtual item, a dark region is formed because the light rays cannot pass through the virtual item. The dark region is the shadow of the virtual item. In some embodiments, for any virtual item in the virtual scene, if all or a part of a shadow of the virtual item is within the scene range corresponding to the first level, the virtual item is the first virtual item corresponding to the first level. The first level corresponds to the at least one first virtual item.

In a possible implementation, Operation 202 includes Operation 2021 to Operation 2023.

Operation 2021: Obtain reference projection ranges of a plurality of virtual items in the virtual scene in a first projection coordinate system;

In some embodiments, the plurality of virtual items in the virtual scene may be all the virtual items in the virtual scene, or may be a part of virtual items selected from all the virtual items in the virtual scene. The part of selected virtual items may be referred to as candidate virtual items corresponding to any first level. A manner of determining the candidate virtual item corresponding to any first level is described below.

For example, before Operation 2021, the method further includes: expanding the scene range corresponding to the first level based on an expansion parameter, to obtain a reference range corresponding to the first level; and selecting a plurality of virtual items located in the reference range.

The expansion parameter is not limited in this embodiment of this application. For example, the expansion parameter may be an expansion scale, and the expansion scale is greater than 1. In this case, the range size of the scene range corresponding to the first level is multiplied by the expansion scale to obtain the range size of the reference range corresponding to the first level. Alternatively, the expansion parameter may be an expansion scene range. In this case, the extension scene range is added to the scene range corresponding to the first level to obtain the reference range corresponding to the first level.

Next, a virtual item located within the reference range corresponding to the first level is selected from all the virtual items in the virtual scene, and the selected virtual item is used as a candidate virtual item corresponding to the first level. The candidate virtual items corresponding to the first level are also the plurality of virtual items in the virtual scene mentioned in Operation 2021.

Then, any virtual item in the virtual scene is projected into the first projection coordinate system based on a light source in a first projection space, to obtain a reference projection range of the virtual item in the first projection coordinate system. For ease of description, the reference projection range of the virtual item on the first projection coordinate system is referred to as the reference projection range of the virtual item for short. In this case, the reference projection range of the virtual item is configured for describing the projection of the virtual item in the first projection coordinate system. The first projection coordinate system is configured for defining the first projection space, and the reference projection range of the virtual item is equivalent to a reference projection range of the virtual item on a projection surface of the first projection space. The light source in the first projection space may be parallel light, a point light source, or the like. The projection manner of the virtual item is not limited in this embodiment of this application.

In some embodiments, Operation 2021 includes Operation C1 to Operation C3.

Operation C1: Determine, for any virtual item, a bounding box of the virtual item.

Because the virtual item may be of an irregular shape and a complex structure, and the bounding box is of a regular shape and a simple structure, by determining the bounding box of the virtual item, a complex three-dimensional structure corresponding to the virtual item is simplified into a simple three-dimensional structure corresponding to the bounding box, thereby reducing a data volume and structural complexity, and providing a foundation for simplification of subsequent data processing.

In the field of three-dimensional modeling technologies, triangle mesh data of the virtual item is commonly used to describe the virtual item. The triangle mesh data of the virtual item includes data of a plurality of vertices, and data of any vertex includes an identifier of the vertex, three-dimensional coordinates of the vertex in a virtual scene coordinate system, identifiers of other vertices connected to the vertex, and the like. The bounding box of the virtual item may be determined based on the triangle mesh data of the virtual item. The bounding box of the virtual item is the smallest geometric body that can enclose the virtual item. The geometric body may be a hexahedron, a cylinder, a ball, or the like.

In some embodiments, the virtual scene coordinate system includes a horizontal axis (namely, an x-axis), a vertical axis (namely, a y-axis), and a longitudinal axis (namely, a z-axis). A vertex with the smallest coordinate on the horizontal axis, a vertex with the largest coordinate on the horizontal axis, a vertex with the smallest coordinate on the vertical axis, a vertex with the largest coordinate on the vertical axis, a vertex with the smallest coordinate on the longitudinal axis, and a vertex with the largest coordinate on the longitudinal axis may be determined from the triangle mesh data of the virtual item. Six planes can be determined by using the six vertices, so that the smallest hexahedron enclosing the virtual item is obtained, that is, the bounding box of the virtual item is obtained.

Alternatively, the triangle mesh data of the virtual item may be analyzed by using a principal component analysis (PCA) method, to determine information such as directions of three coordinate axes, lengths of three sides, coordinates of a center point, and the like. Determining such information is equivalent to determining the bounding box of the virtual item.

The PCA method may be used to search the three-dimensional space for a set of mutually orthogonal coordinate axes, to obtain the directions of the three coordinate axes of the bounding box of the virtual item. A direction of the first coordinate axis satisfies a case that when the vertices corresponding to the virtual item are projected on the coordinate axis, a variance of the projected vertices is the largest. A direction of the second coordinate axis satisfies a case that when the vertices corresponding to the virtual item are projected on the coordinate axis in a plane orthogonal to the first coordinate axis, a variance of the projected vertices is the largest. A direction of the third coordinate axis satisfies a case that when the vertices corresponding to the virtual item are projected on the coordinate axis in a plane orthogonal to the foregoing two coordinate axes, a variance of the projected vertices is the largest. Coordinates of the center point of the virtual item may be obtained by averaging the three-dimensional coordinates of the vertices corresponding to the virtual item, and the coordinates of the center point of the virtual item are used as coordinates of the center point of the bounding box of the virtual item. Lengths of the three sides of the bounding box of the virtual item are determined based on distribution of the vertices corresponding to the virtual item on the three coordinate axes.

Operation C2: Determine first projection information of the virtual item based on the bounding box, the first projection information being configured for describing a projection of the bounding box in the first projection coordinate system.

A data volume of the bounding box of the virtual item needs to be less than a data volume of the virtual item, and a three-dimensional structure of the bounding box of the virtual item is simpler than that of the virtual item. Therefore, in comparison with using data describing the projection of the virtual item in the first projection coordinate system, determining the first projection information of the virtual item based on the bounding box of the virtual item can realize determining of an approximate projection range of the virtual item based on a small amount of data and a simple three-dimensional structure, which improves a processing speed and helps improve rendering efficiency.

A bounding box of any virtual item in the virtual scene is projected into the first projection coordinate system based on the light source in the first projection space, to obtain a projection of the bounding box of the virtual item in the first projection coordinate system, to obtain the first projection information of the virtual item. Because the bounding box of the virtual item includes a plurality of vertices, coordinates of the vertices in the virtual scene coordinate system may be used to describe the bounding box of the virtual item. In some embodiments, the coordinates of the vertices in the virtual scene coordinate system are transformed into coordinates of the vertices in the first projection coordinate system, to obtain the first projection information of the virtual item.

Because the first projection coordinate system is configured for defining the first projection space, the projection of the bounding box of the virtual item in the first projection coordinate system is equivalent to a projection of the virtual item on a projection surface of the first projection space.

Figure 5:
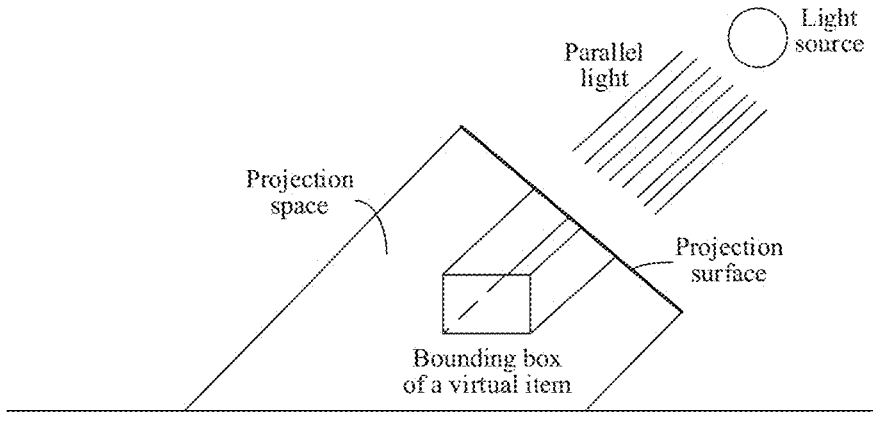
FIG. 5 is a schematic diagram of a projection according to an embodiment of this application.
Figure 6:
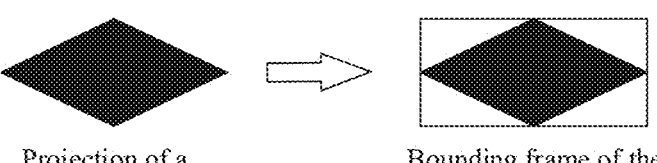
FIG. 6 is a schematic diagram of a projection and a bounding frame of a projection according to an embodiment of this application.

Referring to FIG. 5, FIG. 5 is a schematic diagram of a projection according to an embodiment of this application. In this example, the light source in the projection space is parallel light. The bounding box of the virtual item in the virtual scene is projected onto the projection surface of the projection space based on the parallel light, to obtain the projection of the bounding box of the virtual item on the projection surface. Referring to FIG. 6, FIG. 6 is a schematic diagram of a projection and a projected bounding frame according to an embodiment of this application. The left side of FIG. 6 shows a projection of a bounding box of a virtual item. The projection is a projection of the bounding box of the virtual item on a projection surface of a projection space.

Operation C3: Determine the reference projection range of the virtual item based on the first projection information.

In some embodiments, the first projection information of the virtual item is determined as the reference projection range of the virtual item in the first projection coordinate system. In this case, the reference projection range of the virtual item in the first projection coordinate system is configured for describing the projection of the bounding box of the virtual item in the first projection coordinate system.

In some embodiments, Operation C3 includes: determining second projection information of the virtual item based on the first projection information, the second projection information being configured for describing a bounding frame of the projection of the bounding box in the first projection coordinate system; and determining the second projection information as the reference projection range of the virtual item.

The bounding frame of the projection of the bounding box of the virtual item in the first projection coordinate system is described. Because the projection may be of an irregular shape and has a complex structure, and the bounding frame is of a regular shape and has a simple structure, it is possible to simplify the complex two-dimensional structure corresponding to the projection into a simple two-dimensional structure corresponding to the bounding frame, thereby reducing a data amount and structural complexity, and providing a basis for simplification of subsequent data processing.

In this embodiment of this application, the bounding box of the virtual item includes a plurality of vertices, and the first projection information of the virtual item may include coordinates of the vertices in the first projection coordinate system. The first projection coordinate system is a three-dimensional coordinate system, and includes a horizontal axis, a vertical axis, and a longitudinal axis. Coordinates of the vertices in the first projection coordinate system correspond to a same value on the longitudinal axis. Therefore, the vertices are located on a plane perpendicular to the longitudinal axis in the first projection coordinate system. A vertex with the smallest value on the horizontal axis, a vertex with the largest value on the horizontal axis, a vertex with the smallest value on the vertical axis, and a vertex with the largest value on the vertical axis may be determined from the plurality of vertices. Because one bounding frame can be determined based on the four vertices, coordinates of the four vertices in the first projection coordinate system may be used as the second projection information of the virtual item, to describe the bounding frame of the projection of the bounding box of the virtual item in the first projection coordinate system by using the second projection information of the virtual item. Referring to FIG. 6, the right side of FIG. 6 shows a projected bounding frame of the bounding box of the virtual item. The projection is the projection of the bounding box of the virtual item in the first projection coordinate system.

Next, second projection information of any virtual item may be determined as the reference projection range of the virtual item in the first projection coordinate system. In this case, the reference projection range of the virtual item in the first projection coordinate system is configured for describing the bounding frame of the projection of the bounding box of the virtual item in the first projection coordinate system. In some embodiments, the projected bounding frame of the bounding box of the virtual item in the first projection coordinate system is a rectangle. In this case, the reference projection range of the virtual item may be coordinates of four vertices, four boundaries of the rectangle, or the like.

Operation 2022: Determine a first projection range of the first level in the first projection coordinate system based on the scene range corresponding to the first level.

Because the scene range corresponding to the first level is a partial range in the first visible scene, the scene range corresponding to the first level is relative to a virtual scene coordinate system. Moreover, because the reference projection range of the virtual item is relative to the first projection coordinate system, a first projection range of any first level in the first projection coordinate system may be determined based on a scene range corresponding to the first level, to place the first projection range corresponding to the first level and the reference projection range of the virtual item in the same coordinate system for subsequent processing.

The scene range corresponding to the first level is projected into the first projection coordinate system based on the light source in the first projection space, to obtain a projection of the scene range corresponding to the first level in the first projection coordinate system, to obtain the first projection range of the first level in the first projection coordinate system.

In some embodiments, the scene range corresponding to the first level is a rectangle. Coordinates of vertices of the rectangle in the virtual scene coordinate system may be transformed into coordinates of vertices in the first projection coordinate system, or boundaries of the rectangle in the virtual scene coordinate system may be transformed into boundaries in the first projection coordinate system, to obtain the first projection range of the first level in the first projection coordinate system.

Operation 2023: Determine, for any virtual item, the virtual item as the first virtual item if the reference projection range of the virtual item and the first projection range intersect.

In this embodiment of this application, the reference projection range of the virtual item in the first projection coordinate system is configured for describing an approximate projection region of the virtual item in the first projection coordinate system, and the first projection range of the first level in the first projection coordinate system is configured for describing a projection of the scene range corresponding to the first level in the first projection coordinate system. Therefore, it may be determined whether the reference projection range of the virtual item in the first projection coordinate system is included in the first projection range of the first level in the first projection coordinate system.

When all or a part of a reference projection range of any virtual item in the first projection coordinate system is included in a first projection range of the first level in the first projection coordinate system, it indicates that the reference projection range of the virtual item in the first projection coordinate system and the first projection range of the first level in the first projection coordinate system intersect, and the virtual item is projected in the scene range corresponding to the first level. Therefore, the virtual item may be determined as the first virtual item corresponding to the first level.

Figure 7:
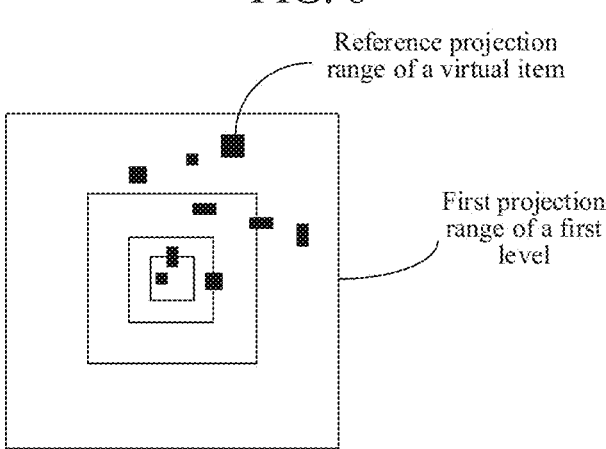
FIG. 7 is a schematic diagram of a relationship between a reference projection range of a virtual item and a first projection range of a first level according to an embodiment of this application.

Referring to FIG. 7, FIG. 7 is a schematic diagram of a relationship between a reference projection range of a virtual item and a first projection range of a first level according to an embodiment of this application. FIG. 7 shows first projection ranges of four first levels, which are respectively first projection ranges of the $1^{st}$ to the $4^{th}$ first levels from inside to outside, and FIG. 7 further shows reference projection ranges of nine virtual items.

It can be learned from FIG. 7 that, the first projection range of the $1^{st}$ first level intersects reference projection ranges of two virtual items. In this case, first virtual items corresponding to the $1^{st}$ first level are the two virtual items. Similarly, first virtual items corresponding to the $2^{nd}$ first level are three virtual items; first virtual items corresponding to the $3^{rd}$ first level are five virtual items; and first virtual items corresponding to the $4^{th}$ first level are nine virtual items.

Because any first level corresponds to at least one first virtual item, a virtual item list may be created for any first level. The virtual item list corresponding to any first level includes identification information of each first virtual item corresponding to the first level, and a corresponding first virtual item may be found through any piece of identification information.

In this embodiment of this application, whether the virtual item is the first virtual item corresponding to the first level is determined by determining an intersection relationship between the projection of the scene range corresponding to the first level and the projection of the bounding box of the virtual item. In comparison with the virtual item, the bounding box of the virtual item is a simple three-dimensional structure, and the projection of the bounding box has a small data volume and a simpler structure. In addition, in comparison with a viewing frustum, the scene range corresponding to the first level is also a simple structure, whose projection has a small data volume and a simpler structure. Therefore, in comparison with directly determining whether the virtual item is within the viewing frustum, in this embodiment of this application, whether the virtual item is the first virtual item corresponding to the first level can be quickly determined based on a simple structure and a small data volume, thereby improving computing performance.

Operation 203: Determine a first projection depth map corresponding to the first level based on the first virtual item, the first projection depth map being configured for describing distances between a plurality of first vertices and a light source, the plurality of first vertices being each a vertex on a surface of the first virtual item facing the light source.

In a possible implementation, the projection depth map corresponding to the first level may be determined based on a light source in a second projection space and the first virtual item corresponding to the first level. For ease of description, the projection depth map corresponding to any first level is referred to as the first projection depth map for short. In some embodiments, the first virtual item corresponding to the first level may be rendered along an illumination direction of the light source in the second projection space, to obtain distances between the light source and vertices on a surface of the first virtual item facing the light source. A distance between any vertex and the light source is also referred to as a projection depth value of the vertex. The first projection depth map includes projection depth values of first vertices (to be specific, the vertices on the surface of the first virtual item facing the light source).

Because the first levels correspond to different range sizes, a projection depth map corresponding to one first level records projection depth values within a certain range. For example, a projection depth map corresponding to the $1^{st}$ first level (denoted as Level0) records projection depth values within 32 meters, a projection depth map corresponding to the $2^{nd}$ first level (denoted as Level1) records projection depth values within 64 meters, a projection depth map corresponding to the $3^{rd}$ first level (denoted as Level2)

records projection depth values within 128 meters, and so on, up to a maximum range size.

Figure 8:
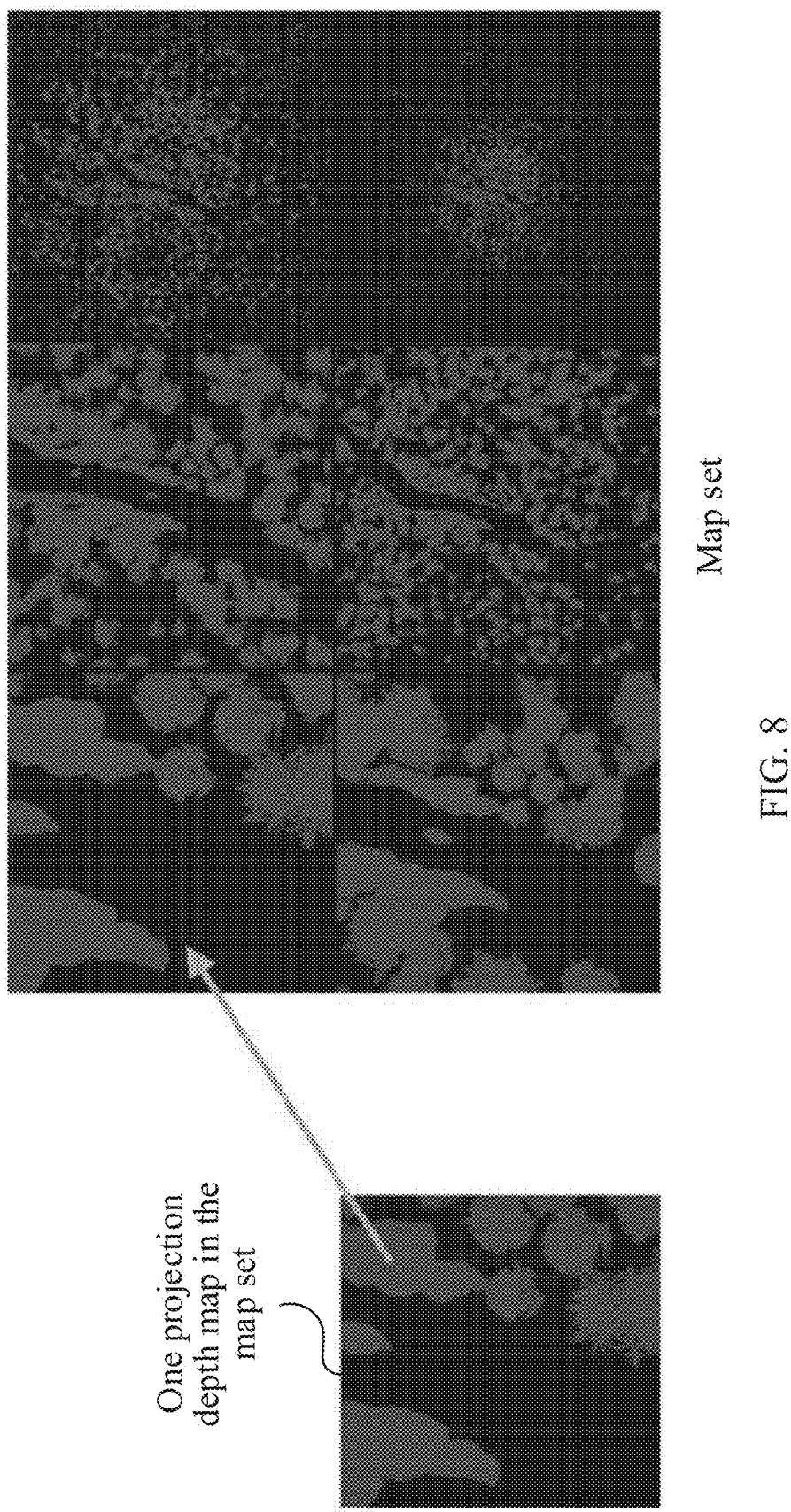
FIG. 8 is a schematic diagram of a projection depth map according to an embodiment of this application.

Projection depth maps corresponding to the first levels may be considered as a map set. A render texture object may be configured, and the map set is saved by using the object. Referring to FIG. 8, the left side of FIG. 8 shows a projection depth map corresponding to a first level, and the right side of FIG. 8 shows a map set. The map set includes projection depth maps corresponding to six first levels. The projection depth map shown on the left side of FIG. 8 is a projection depth map in the map set shown on the right side of FIG. 8.

In a possible implementation, Operation 203 includes Operation 2031 to Operation 2034.

Operation 2031: Determine three-dimensional projection coordinates of the vertices of the first virtual item in the second projection coordinate system based on three-dimensional scene coordinates of the vertices of the first virtual item in the virtual scene coordinate system.

For ease of description, the three-dimensional coordinates of the vertices in the virtual scene coordinate system are referred to as three-dimensional scene coordinates of the vertices for short, and the three-dimensional coordinates of the vertices in the second projection coordinate system are referred to as three-dimensional projection coordinates of the vertices for short. The three-dimensional scene coordinates of the vertices of the first virtual item corresponding to the first level may be converted into the three-dimensional projection coordinates of the vertices of the first virtual item corresponding to the first level based on a conversion relationship between the virtual scene coordinate system and the second projection coordinate system. The foregoing conversion relationship is not limited in this embodiment of this application.

Operation 2032: Determine an adjustment coefficient based on the scene range corresponding to the first level and a resolution of the first projection depth map.

In some embodiments, a ratio of the range size of the scene range corresponding to the first level to the resolution of the projection depth map corresponding to the first level is used as the adjustment coefficient, or at least one calculation such as weighting, logarithmic, or exponential is performed on the ratio, to obtain the adjustment coefficient.

Operation 2033: Adjust the three-dimensional projection coordinates of the vertices of the first virtual item based on the adjustment coefficient, to obtain adjusted three-dimensional projection coordinates of the vertices of the first virtual item.

For ease of description, three-dimensional coordinates of the vertices that are adjusted in the second projection coordinate system are referred to as the adjusted three-dimensional projection coordinates of the vertices. For any vertex of the first virtual item corresponding to any first level, three-dimensional projection coordinates of the vertex may be used as a dividend, and the adjustment coefficient is used as a divisor. According to the calculation formula "dividend÷divisor=quotient . . . remainder", the quotient may be obtained, and the quotient is multiplied by the adjustment coefficient to obtain the adjusted three-dimensional projection coordinates of the vertex.

In some embodiments, in this embodiment of this application, the three-dimensional projection coordinates of the vertices are adjusted according to the following three-dimensional coordinate adjustment code, to obtain the adjusted three-dimensional projection coordinates, so that when conversion between the second projection coordinate system and the virtual scene coordinate system is performed, the three-dimensional coordinates are rounded and aligned according to pixels.

```
Vector3 PositionAlignment(Vector3 pos)
{
    float range=32.0f;          //range size corresponding to the first level
    int resolution=512;          //resolution of the projection depth map
corresponding to the first level
    float meterPerPixel=range/resolution;    //adjustment coefficient
    pos.x=Mathf.Floor(pos.x/meterPerPixel)*meterPerPixel;
    pos.y=Mathf.Floor(pos.y/meterPerPixel)*meterPerPixel;
    pos.z=Mathf.Floor(pos.z/meterPerPixel)*meterPerPixel;
    return pos;
}
``` meterPerPixel represents the adjustment coefficient. Three-dimensional projection coordinates of a vertex include a value on a horizontal axis pos.x, a value on a vertical axis pos.y, and a value on a longitudinal axis pos.z. pos.x=Mathf.Floor(pos.x/meterPerPixel)*meterPerPixel represents a quotient, obtained by dividing the value on the horizontal axis pos.x by the adjustment coefficient, is multiplied by the adjustment coefficient, to obtain an adjusted value on the horizontal axis pos.x. Mathf.Floor represents a function of searching for a maximum integer, where the found maximum integer is less than or equal to a specified floating point value. Therefore, Mathf.Floor(pos.x/meterPerPixel) represents the quotient. Based on the same principle as pos.x, the value on the vertical axis pos.y and the value on the longitudinal axis pos.z are also similarly adjusted. The adjusted three-dimensional projection coordinates of the vertex include the adjusted value on the horizontal axis pos.x, an adjusted value on the vertical axis pos.y, and an adjusted value on the longitudinal axis pos.z.

Operation 2034: Determine the first projection depth map based on three-dimensional projection coordinates of the light source in the second projection coordinate system and the adjusted three-dimensional projection coordinates of the vertices of the first virtual item.

In some embodiments, for ease of description, three-dimensional coordinates of the light source in the virtual scene coordinate system are referred to as three-dimensional scene coordinates of the light source for short, and three-dimensional coordinates of the light source in the second projection coordinate system are referred to as three-dimensional projection coordinates of the light source for short. The three-dimensional coordinates of the reference point in the virtual scene coordinate system are referred to as three-dimensional scene coordinates of the reference point for short, and three-dimensional coordinates of the reference point that are adjusted in the virtual scene coordinate system are referred to as adjusted three-dimensional scene coordinates of the reference point for short. The three-dimensional coordinates of the reference point in the second projection coordinate system are referred to as three-dimensional projection coordinates of the reference point for short, and three-dimensional coordinates of the reference point that are adjusted in the second projection coordinate system are referred to as adjusted three-dimensional projection coordinates of the reference point for short.

The three-dimensional scene coordinates of the reference point may be used as the three-dimensional scene coordinates of the light source, and the three-dimensional scene coordinates of the light source may be converted into the three-dimensional scene coordinates of the light source. Alternatively, the three-dimensional scene coordinates of the reference point may be converted into the three-dimensional projection coordinates of the reference point. The three-dimensional projection coordinates of the reference point are adjusted based on the adjustment coefficient, to obtain the adjusted three-dimensional projection coordinates of the reference point. The adjusted three-dimensional projection coordinates of the reference point are converted into the adjusted three-dimensional scene coordinates of the reference point. The three-dimensional scene coordinates of the light source are set to the adjusted three-dimensional scene coordinates of the reference point.

Then, the three-dimensional scene coordinates of the light source are converted into the three-dimensional projection coordinates of the light source, to determine the first projection depth map corresponding to the first level based on the three-dimensional projection coordinates of the light source and the adjusted three-dimensional projection coordinates of the vertices of the first virtual item corresponding to the first level.

For example, for any vertex of a first virtual item corresponding to any first level, a distance between the vertex and the light source may be calculated by using the three-dimensional projection coordinates of the light source and adjusted three-dimensional projection coordinates of the vertex, and the distance is also a projection depth value of the vertex. Projection depth values of the vertices are calculated, and the projection depth values of the first vertices are selected from the projection depth values of the vertices, to obtain the first projection depth map corresponding to the first level. The first vertices are vertices on the surface of the first virtual item facing the light source, and the projection depth values of the first vertices of the first virtual item corresponding to the first level are recorded in the first projection depth map.

Alternatively, adjusted three-dimensional projection coordinates of the first vertices are determined from the adjusted three-dimensional projection coordinates of the vertices of the first virtual item corresponding to the first level. The distances between the first vertices and the light source are determined based on the adjusted three-dimensional projection coordinates of the first vertices and the three-dimensional projection coordinates of the light source, to obtain the first projection depth map corresponding to the first level.

In some embodiments, Operation 2034 includes: adjusting the three-dimensional projection coordinates of the light source based on the adjustment coefficient, to obtain adjusted three-dimensional projection coordinates of the light source; and determining the first projection depth map based on the adjusted three-dimensional projection coordinates of the light source and the adjusted three-dimensional projection coordinates of the vertices of the first virtual item.

In this embodiment of this application, for the manner of adjusting the three-dimensional projection coordinates of the light source, refer to the descriptions of Operation 2033. Details are not described herein again. In short, the three-dimensional projection coordinates of the light source may be used as a dividend, and the adjustment coefficient is used as a divisor. According to the calculation formula "dividend÷divisor=quotient . . . remainder", the quotient may be obtained, and the quotient is multiplied by the adjustment coefficient to obtain the adjusted three-dimensional projection coordinates of the light source.

In this embodiment of this application, the adjusted three-dimensional projection coordinates of the light source are determined according to Operations E1 to E8 as follows.

Operation E1: Obtain three-dimensional scene coordinates Pos of a reference point, where the reference point may be a center point or a center of gravity point of a scene range corresponding to any first level.

Operation E2: Obtain a rotation matrix lightMatrix of a light source, where the rotation matrix includes an illumination direction of the light source and initialization coordinates of the light source.

Operation E3: Convert Pos into PosInLight, where PosInLight is three-dimensional projection coordinates of the reference point.

Operation E4: PosInLight=PositioningAlignment(PosInLight), where PositioningAlignment is the three-dimensional coordinate adjustment code mentioned above. Therefore, Operation E4 is equivalent to adjusting the three-dimensional projection coordinates of the reference point, to obtain adjusted three-dimensional projection coordinates of the reference point.

Operation E5: Convert PosInLight into PosInWorld by using an inverse matrix of lightMatrix, where PosInWorld is the adjusted three-dimensional scene coordinates of the reference point.

Operation E6: Assign PosInWorld to the initialization coordinates of the light source in the lightMatrix. Operation E6 is equivalent to adjusting the initialization coordinates of the light source to PosInWorld, in other words, setting the three-dimensional scene coordinates of the light source to PosInWorld.

Operation E7: Calculate the inverse matrix lightMatrixInverse of lightMatrix. Operation E7 is equivalent to converting three-dimensional scene coordinates of the light source into the three-dimensional projection coordinates of the light source, where the illumination direction of the light source remains unchanged.

Operation E8: Align coordinate values in lightMatrixInverse by using PositionAlignment, to obtain a final projection matrix. PositionAlignment is the three-dimensional coordinate adjustment code mentioned above. Therefore, Operation E8 is equivalent to adjusting the three-dimensional projection coordinates of the light source, to obtain the adjusted three-dimensional projection coordinates of the light source.

Then, for any vertex of a first virtual item corresponding to any first level, a distance between the vertex and the light source may be calculated by using the adjusted three-dimensional projection coordinates of the light source and adjusted three-dimensional projection coordinates of the vertex, and the distance is also a projection depth value of the vertex. Projection depth values of the vertices are calculated, and the first projection depth map corresponding to the first level can be obtained by using the projection depth values of the first vertices.

Alternatively, adjusted three-dimensional projection coordinates of the first vertices are determined from the adjusted three-dimensional projection coordinates of the vertices of the first virtual item corresponding to the first level. The distances between the first vertices and the light source are determined based on the adjusted three-dimensional projection coordinates of the first vertices and the adjusted three-dimensional projection coordinates of the light source, to obtain the first projection depth map corresponding to the first level.

The three-dimensional projection coordinates of the vertices and the light source are adjusted based on the three-dimensional coordinate adjustment code, to obtain the adjusted three-dimensional projection coordinates, so that when conversion between the second projection coordinate system and the virtual scene coordinate system is performed, the three-dimensional coordinates are rounded and aligned according to pixels. Due to the alignment operation, during transformation of the first visible scene, for example, rotation of the first visible scene or translation of the first visible scene, a shadow of a virtual item in the first visible scene after transformation can be the same as a shadow of the virtual item in the first visible scene before transformation. In other words, an effect that the shadow is not shook during transformation of the first visible scene is achieved, thereby improving realness of the first visible scene.

In a possible implementation, Operation 203 includes Operation 2035 to Operation 2036. In the foregoing Operation 2031 to Operation 2034, the first projection depth map corresponding to the first level is obtained through directly projection by using all virtual items whose shadows are within the scene range corresponding to the first level. This belongs to a global updating manner. In Operation 2035 and Operation 2036, the first projection depth map corresponding to the first level is determined based on a partial updating manner. The following describes both Operation 2035 and Operation 2036 in detail.

Operation 2035: Obtain, for any first level, in response to a related movement amplitude of a virtual object relative to a related level being greater than a movement threshold, a related projection depth map corresponding to the related level, the related level being a second level whose scene range is of a same size as a scene range corresponding to the first level, the related projection depth map being configured for describing distances between a plurality of second vertices and the light source, the plurality of second vertices being each a vertex on a surface of a third virtual item corresponding to the related level facing the light source, and the third virtual item being a virtual item whose shadow is within a scene range corresponding to the related level.

In this embodiment of this application, there is a second level having the same range size as the first level in the plurality of second levels, and the second level is denoted as a related level of the first level. The related content of the second level and the manner of determining the movement amplitude of the virtual object relative to the second level are described above. Details are not described herein again. In addition, content of a projection depth map corresponding to the second level is similar to content of the projection depth map corresponding to the first level. Details are not described herein again.

A cache of the electronic device stores projection depth maps corresponding to the second levels, so that the projection depth map corresponding to the second level can be directly used subsequently or locally updated, to reduce performance overheads of a graphics processing unit.

For case of description, a movement amplitude of the virtual object relative to a related level is referred to as a related movement amplitude, and a projection depth map corresponding to the related level is referred to as a related projection depth map. When the related movement amplitude is greater than the movement threshold, the related projection depth map can be obtained. In some embodiments, the projection depth maps corresponding to the second levels may alternatively be considered as the map set, and the map set is updated to obtain the projection depth maps corresponding to the first levels. For ease of description, a map set before updating is referred to as a second map set. The second image map set includes the projection depth maps corresponding to the second levels. A map set after updating is referred to as a first map set. The first map set includes the projection depth maps corresponding to the first levels. When the related movement amplitude is greater than the movement threshold, the related projection depth map may be copied from the second map set.

Operation 2036: Determine the first projection depth map based on the first virtual item and the related projection depth map.

Because the first level and the related level correspond to the same range size, the projection depth map corresponding to the related level may be updated based on the first virtual item corresponding to the first level, to obtain the projection depth map corresponding to the first level. In some embodiments, the projection depth map corresponding to the related level is copied from the second map set, and the projection depth map corresponding to the first level is copied back to the second map set, to update the second map set to obtain the first map set.

In a possible implementation, Operation 2036 includes Operation D1 to Operation D3.

Operation D1: Crop the related projection depth map based on the related movement amplitude, to obtain a cropped projection depth map.

When the virtual object moves relative to the related level, the level before the movement (namely, the related level) and the level after the movement (namely, the first level) may correspond to the same content. In other words, the projection depth map corresponding to the related level may include projection depth values corresponding to all or some of the first virtual items corresponding to the first level. Based on this, the projection depth map corresponding to the related level is cropped based on the movement amplitude of the virtual object relative to the related level, so that the cropped projection depth map retains the same projection depth value corresponding to both the relevant level and the first level.

In some embodiments, the movement amplitude of the virtual object relative to the related level is a ratio. In this case, a map corresponding to the ratio is cropped from the projection depth map corresponding to the related level, to obtain the cropped projection depth map.

Operation D2: Determine a second virtual item corresponding to the first level from the first virtual items, the second virtual item being a virtual item whose shadow is within a remaining range corresponding to the first level, and the remaining range being a range of a remaining scene in a scene corresponding to the first level other than a partial scene corresponding to the cropped projection depth map.

The cropped projection depth map corresponds to the partial scene in the scene range corresponding to the first level, and the range of the remaining scene in the scene range corresponding to the first level other than the partial scene is denoted as the remaining range corresponding to the first level. In other words, the scene range corresponding to the first level includes the range of the partial scene and the range of the remaining scene. When the shadow of the first virtual item corresponding to the first level is in the remaining range corresponding to the first level, the first virtual item corresponding to the first level is used as the second virtual item corresponding to the first level. The first level corresponds to the at least one second virtual item.

In some embodiments, Operation D2 includes Operation D21 to Operation D23.

Operation D21: Determine a reference projection range of the first virtual item in the first projection coordinate system. An implementation of Operation D21 is similar to the implementation of Operation 2021, and details are not described herein again.

Operation D22: Determine a second projection range of the first level in the first projection coordinate system based on the remaining range. An implementation of Operation D22 is similar to the implementation of Operation 2022, and details are not described herein again.

Operation D23: Determine the first virtual item as the second virtual item if the reference projection range of the first virtual item and the second projection range intersect. An implementation of Operation D23 is similar to the implementation of Operation 2023, and details are not described herein again.

Operation D3: Determine the first projection depth map based on the second virtual item and the cropped projection depth map.

A shadow of the second virtual item corresponding to the first level is in the remaining scene corresponding to the first level, and the cropped projection depth map describes projection depth values of virtual items whose shadows are in the partial scene. Therefore, the second virtual item corresponding to the first level and the cropped projection depth map may correspond to all virtual items whose shadows are in the scene range corresponding to the first level, so that the projection depth map corresponding to the first level can be determined based on the second virtual item corresponding to the first level and the cropped projection depth map.

In some embodiments, Operation D3 includes Operation D31 to Operation D32.

Operation D31: Determine a supplementary map corresponding to the first level based on the second virtual item, the supplementary map being configured for describing distances between a plurality of third vertices and the light source, and any third vertex being a vertex on a surface of the second virtual item facing the light source.

An implementation principle of Operation D31 is similar to the implementation principle of Operation 203, and details are not described herein again.

Operation D32: Splice the supplementary map and the cropped projection depth map, to obtain the first projection depth map.

The supplementary map corresponding to the first level is spliced on an opposite end of a cropping line of the cropped projection depth map, to obtain the projection depth map corresponding to the first level. For example, 10% of the projection depth map corresponding to the related level is cropped from the bottom. In this case, a lower edge line of the cropped projection depth map is the cropping line. The supplementary map corresponding to the first level may be spliced on an upper edge line of the cropped projection depth map, to obtain the projection depth map corresponding to the first level.

In some embodiments, a blank temporary picture is obtained, and a picture size of the temporary picture is the same as a picture size of the projection depth map corresponding to the first level. The cropped projection depth map is copied to the temporary picture. In this case, a part of content of the temporary picture is the cropped projection depth map, and the other part of the content is blank. The supplementary map corresponding to the first level is copied to a blank space in the temporary picture, to implement splicing between the supplementary map corresponding to the first level and the cropped projection depth map. In this case, there is no blank space in the temporary picture, and the content of the temporary picture is the projection depth map corresponding to the first level.

In some embodiments, the cropped projection depth map may be copied to the temporary picture first. Then, based on the second virtual item corresponding to the first level, the supplementary map corresponding to the first level is written at the blank space in the temporary picture, to implement splicing the supplementary map corresponding to the first level and the cropped projection depth map while determining the supplementary map corresponding to the first level, to obtain the projection depth map corresponding to the first level.

Figure 9:
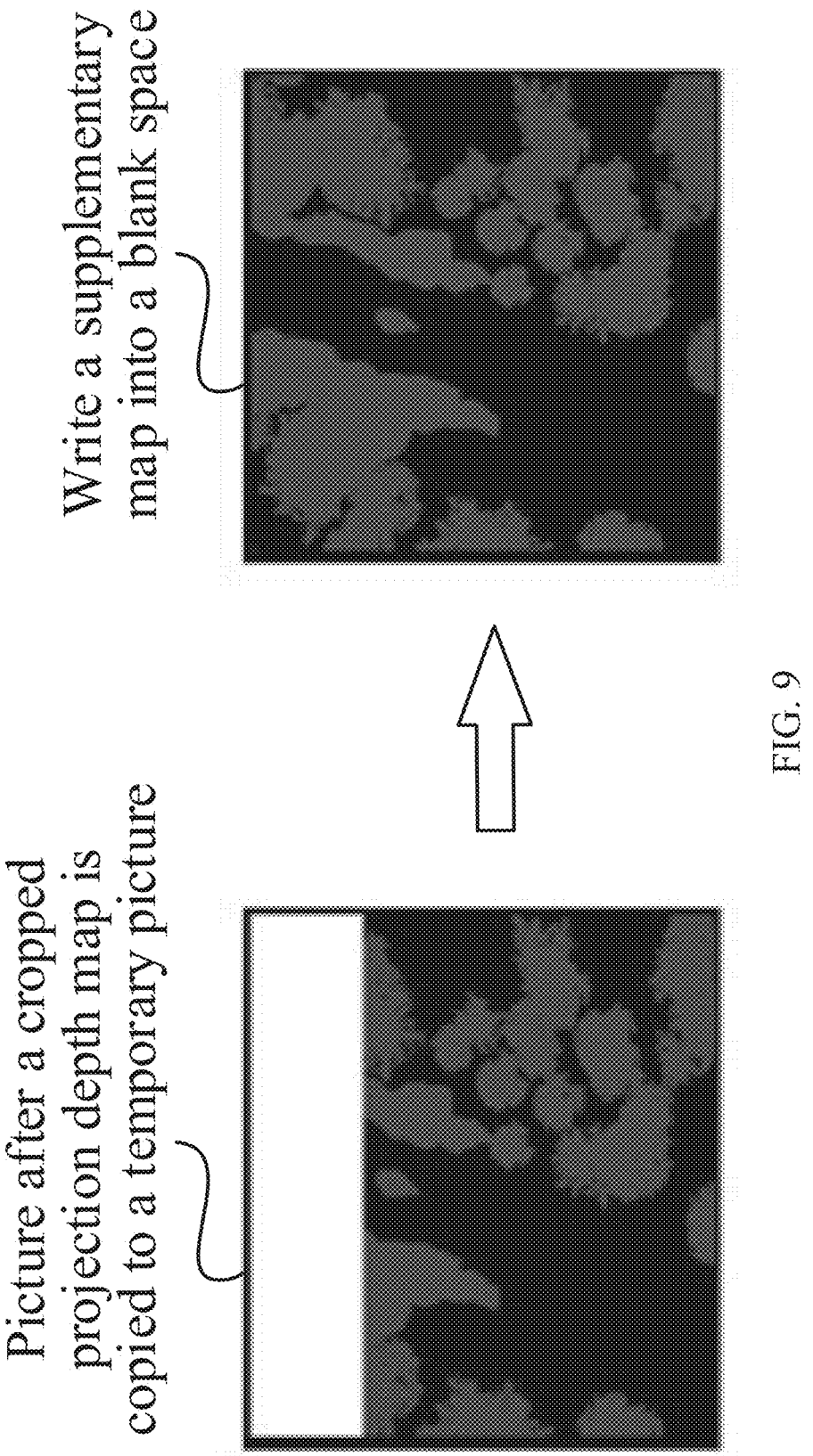
FIG. 9 is a schematic diagram of determination of a projection depth map according to an embodiment of this application.

Referring to FIG. 9, FIG. 9 is a schematic diagram of determination of a projection depth map according to an embodiment of this application. The left side of FIG. 9 shows a schematic diagram in which the cropped projection depth map is copied to the temporary picture. In this case, there is a blank space in the temporary picture. For example, the blank space occupies 10% of the temporary picture. The supplementary map corresponding to the first level is written into the blank space in the temporary picture, to obtain the schematic diagram shown on the right side of FIG. 9. In this case, the content of the temporary picture is the projection depth map corresponding to the first level.

In this embodiment of this application, when the movement amplitude of the virtual object relative to the related level is greater than the movement threshold, it may be understood as that content in the scene range corresponding to the level after the virtual object moves is changed greatly compared with content in the scene range corresponding to the level before the virtual object moves. In this case, the projection depth map corresponding to the related level may be cropped, and the supplementary map corresponding to the first level is determined. The supplementary map corresponding to the first level is spliced with the cropped projection depth map, to obtain the projection depth map corresponding to the first level. According to the partial updating manner of the projection depth map, it is possible to avoid re-projecting the same part in the projection depth map corresponding to the first level and the projection depth map corresponding to the related level, and only different parts are projected, thereby reducing an amount of calculation and improving calculation efficiency.

In a possible implementation, the shadow rendering method in the embodiments of this application further includes Operation 2037, and Operation 2037 is performed before Operation 204.

Operation 2037: Determine the related projection depth map as the first projection depth map in response to the related movement amplitude being not greater than the movement threshold.

In this embodiment of this application, the related level is a level before the virtual object moves, and the first level is a level after the virtual object moves. When the movement amplitude of the virtual object relative to the related level is not greater than the movement threshold, content in the scene range corresponding to the level after the virtual object moves is changed slightly compared with content in the scene range corresponding to the level before the virtual object moves, and the change may be ignored. By determining the projection depth map corresponding to the related level as the projection depth map corresponding to the first level, re-projection of the projection depth map corresponding to the first level is avoided, thereby reducing the amount of calculation, and shadows in the scene range corresponding to the level before the virtual object moves are the same as shadows in the scene range corresponding to the level after the virtual object moves.

Currently, there is a shadow rendering solution of Shadow Map. When a camera location or a camera direction changes, a relationship between a virtual item and a viewing frustum needs to be determined. When all or a part of the virtual item is within the viewing frustum, the virtual item may be used as the target item. A depth projection map corresponding to the target item is determined, to render a shadow by using the depth projection map corresponding to the target item. Therefore, in the Shadow Map, the depth projection map needs to be re-projected whenever the camera location or the camera direction changes. However, in this embodiment of this application, when the movement amplitude of the virtual object relative to the related level is greater than the movement threshold, the projection depth map corresponding to the first level is projected by using the partial updating method of the projection depth map, which reduces a calculation amount and improves calculation efficiency. In addition, when the movement amplitude of the virtual object relative to the related level is not greater than the movement threshold, the projection depth map is unchanged. In comparison with the Shadow Map, in this embodiment of this application, the projection depth map may not be updated when only the camera direction is changed (for example, the camera is rotated but the camera position is unchanged) or the movement amplitude of the virtual object is small (which may correspond to a case that a movement amplitude of the camera is small), thereby achieving an effect of not updating the shadow and reducing the rendering overheads.

Operation 204: Render the shadow in the first visible scene based on the first projection depth map.

The projection depth map corresponding to the first level records projection depth values of virtual items whose shadows are within the scene range corresponding to the first level, and scene ranges corresponding to a plurality of first levels constitute the first visible scene. Therefore, through the projection depth maps corresponding to the plurality of first levels, the shadows in the first visible scene may be rendered.

In a possible implementation, Operation 204 includes Operation 2041 to Operation 2044.

Operation 2041: Determine, for any fourth vertex, a first distance between the fourth vertex and the light source, the fourth vertex being a vertex on a surface of a virtual item in the first visible scene facing a camera.

For case of description, three-dimensional coordinates of the fourth vertex in the virtual scene coordinate system are referred to as three-dimensional scene coordinates of the fourth vertex for short, and three-dimensional coordinates of the fourth vertex in the second projection coordinate system are referred to as three-dimensional projection coordinates of the fourth vertex for short. In this embodiment of this application, the electronic device may obtain the three-dimensional scene coordinates of any fourth vertex, and map the three-dimensional scene coordinates of the fourth vertex into the three-dimensional projection coordinates of the fourth vertex. The three-dimensional projection coordinates of the light source are obtained, and the first distance between the fourth vertex and the light source is calculated by using the three-dimensional projection coordinates of the fourth vertex and the three-dimensional projection coordinates of the light source.

In some embodiments, the three-dimensional projection coordinates of the fourth vertex may be adjusted based on the adjustment coefficient, to obtain adjusted three-dimensional projection coordinates of the fourth vertex. The distance between the fourth vertex and the light source is calculated by using the adjusted three-dimensional projection coordinates of the fourth vertex and three-dimensional projection coordinates of the light source, and the distance may be recorded as the first distance. For a manner of adjusting the three-dimensional coordinates of the fourth vertex, refer to descriptions of Operation 2031 to Operation 2033. Implementation principles of the two are similar. Details are not described herein again.

In some embodiments, the three-dimensional projection coordinates of the light source may be adjusted based on the adjustment coefficient, to obtain the adjusted three-dimensional projection coordinates of the light source. The first distance between the fourth vertex and the light source is calculated by using the adjusted three-dimensional projection coordinates of the light source and the three-dimensional projection coordinates of the fourth vertex, or by using the adjusted three-dimensional projection coordinates of the light source and the adjusted three-dimensional projection coordinates of the fourth vertex. For a manner of adjusting the three-dimensional coordinates of the light source, refer to descriptions of Operation 2034. Implementation principles of the two are similar. Details are not described herein again.

Operation 2042: Determine a reference level from the plurality of first levels, the fourth vertex being a vertex on a virtual item in a scene range corresponding to the reference level.

The scene range corresponding to the first level is a partial range in the first visible scene, and any fourth vertex is a vertex on a virtual item in the first visible scene. Therefore, at least one candidate level may be determined from the plurality of first levels based on three-dimensional scene coordinates of the fourth vertex, and the fourth vertex is a vertex on a virtual item in a scene range corresponding to any candidate level. Because the plurality of first levels may be considered as levels having an upper-lower level relationship, and a range size of an upper first level in the plurality of first levels is smaller than a range size of a lower first level, the uppermost level may be determined from the at least one candidate level, and the uppermost level is used as a reference level to determine the projection depth map corresponding to the reference level.

For example, (1) in FIG. 4 shows a first level 0 to a first level 3 having the upper-lower level relationship. When candidate levels include the first level 1 to the first level 3, the reference level is the uppermost level, that is, the first level 1.

Operation 2043: Determine a second distance between a first vertex corresponding to the fourth vertex and the light source from a projection depth map corresponding to the reference level.

In this embodiment of this application, when the projection depth map corresponding to the reference level is determined, (adjusted) three-dimensional projection coordinates of the first vertices need to be determined, so that distances between the first vertices and the light source are determined, to obtain the projection depth map corresponding to the reference level. Based on this, based on (adjusted) three-dimensional projection coordinates of the light source and (adjusted) three-dimensional projection coordinates of any fourth vertex, a first vertex corresponding to the fourth vertex is determined from the first vertices. The fourth vertex and the first vertex corresponding to the fourth vertex are on the same light ray, or in other words, the light source, the fourth vertex, and the first vertex corresponding to the fourth vertex are on the same straight line.

Because the projection depth map corresponding to the reference level describes the distances between the first vertices and the light source, a distance between a first vertex corresponding to any fourth vertex and the light source may be determined based on the projection depth map corresponding to the reference level, and the distance may be recorded as the second distance.

Figure 10:
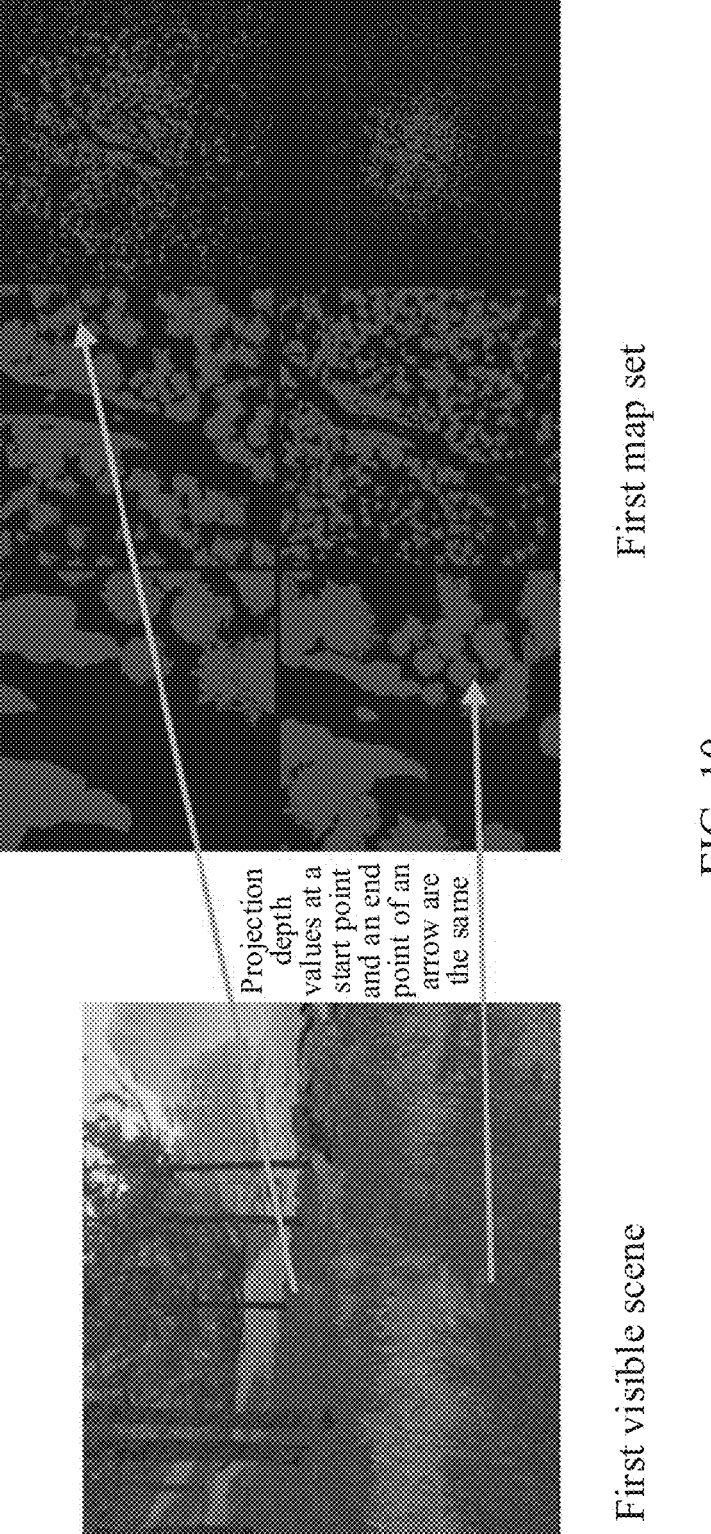
FIG. 10 is a schematic diagram of a relationship between a first visible scene and a projection depth map according to an embodiment of this application.

Referring to FIG. 10, FIG. 10 is a schematic diagram of a relationship between a first visible scene and a projection depth map according to an embodiment of this application. The left side of FIG. 10 shows a first visible scene, and the first visible scene includes fourth vertices facing a camera. The right side of FIG. 10 shows a first image set, and the first image set includes projection depth maps corresponding to first levels. It can be learned from FIG. 10 that, for any fourth vertex (to be specific, a start point of an arrow in FIG. 10) facing the camera, a first vertex (to be specific, an end point of the arrow in FIG. 10) corresponding to the fourth vertex may be determined in the first map set, to obtain a distance between the first vertex corresponding to the fourth vertex and the light source, that is, a projection depth value of the first vertex corresponding to the fourth vertex.

Operation 2044: Render the shadow at a position of the fourth vertex in response to the first distance being greater than the second distance.

The fourth vertex is a vertex on a surface of the virtual item facing the camera, and the first vertex is a vertex on a surface of the virtual item facing the light source. When the first distance is greater than the second distance, it indicates that the camera can see the fourth vertex, but the light source cannot illuminate the fourth vertex. In this case, the fourth vertex is at a position covered by a shadow. Therefore, the electronic device renders the shadow at the position of the fourth vertex. When the first distance is not greater than the second distance, it indicates that the camera can see the fourth vertex, and the light source can illuminate the fourth vertex. In this case, the fourth vertex is at a position illuminated by light. Therefore, the electronic device may calculate illumination information, and render the light at the position of the fourth vertex based on the illumination information.

In this manner, the electronic device may render a shadow or light at any fourth vertex facing the camera in the first visible scene, to render the first visible scene and shadows in the first visible scene.

In this embodiment of this application, the first virtual item corresponding to the first level includes a dynamic virtual item and a static virtual item. In this case, the projection depth map corresponding to the first level in Operation 203 includes both a projection depth value of a first vertex in the dynamic virtual item and a projection depth value of a first vertex in the static virtual item.

In some embodiments, the dynamic virtual item and the static virtual item included in the first virtual item corresponding to the first level are separated. In this case, the projection depth map corresponding to the first level includes a projection depth map corresponding to the dynamic virtual item corresponding to the first level and a projection depth map corresponding to the static virtual item corresponding to the first level. The projection depth map corresponding to the dynamic virtual item corresponding to the first level includes the projection depth value of the first vertex in the dynamic virtual item. The projection depth map corresponding to the static virtual item corresponding to the first level includes the projection depth value of the first vertex in the static virtual item. A first object (for example, Render Texture) may be used to store the projection depth map corresponding to the static virtual item corresponding to the first level, and the second object (for example, Pre Object) may be used to store the projection depth map corresponding to the dynamic virtual item corresponding to the first level, thereby implementing a storage solution in which dynamic and static items are separated.

Information (including but not limited to user equipment information, user personal information, and the like), data (including but not limited to data for analysis, data for storage, data for display, and the like), and signals involved in this application are all authorized by users or fully authorized by all parties, and collection, use, and processing of relevant data need to comply with relevant laws, regulations, and standards of relevant regions. For example, the virtual scene, the movement information of the virtual object, and the like involved in this application are all obtained under full authorization.

In the foregoing method, the scene range corresponding to the first level is a partial range of a first visible scene included in a virtual scene, which is equivalent to determining the scene range corresponding to the first level according to the first visible scene in real time during running of the virtual scene. The first virtual item corresponding to the first level is determined based on the scene range corresponding to the first level, to determine the projection depth map corresponding to the first level based on the first virtual item corresponding to the first level, so that during running of the virtual scene, projection depth maps corresponding to partial ranges of the first visible scene are determined in real time. In comparison with determining and storing shadow maps of the virtual items in the virtual scene, this solution can reduce occupation of storage resources. Shadows in the first visible scene are rendered based on the projection depth maps corresponding to the partial ranges of the first visible scene. In this way, it is beneficial to improving a presentation effect of the shadows and improving fidelity of the virtual scene.

Figure 11:
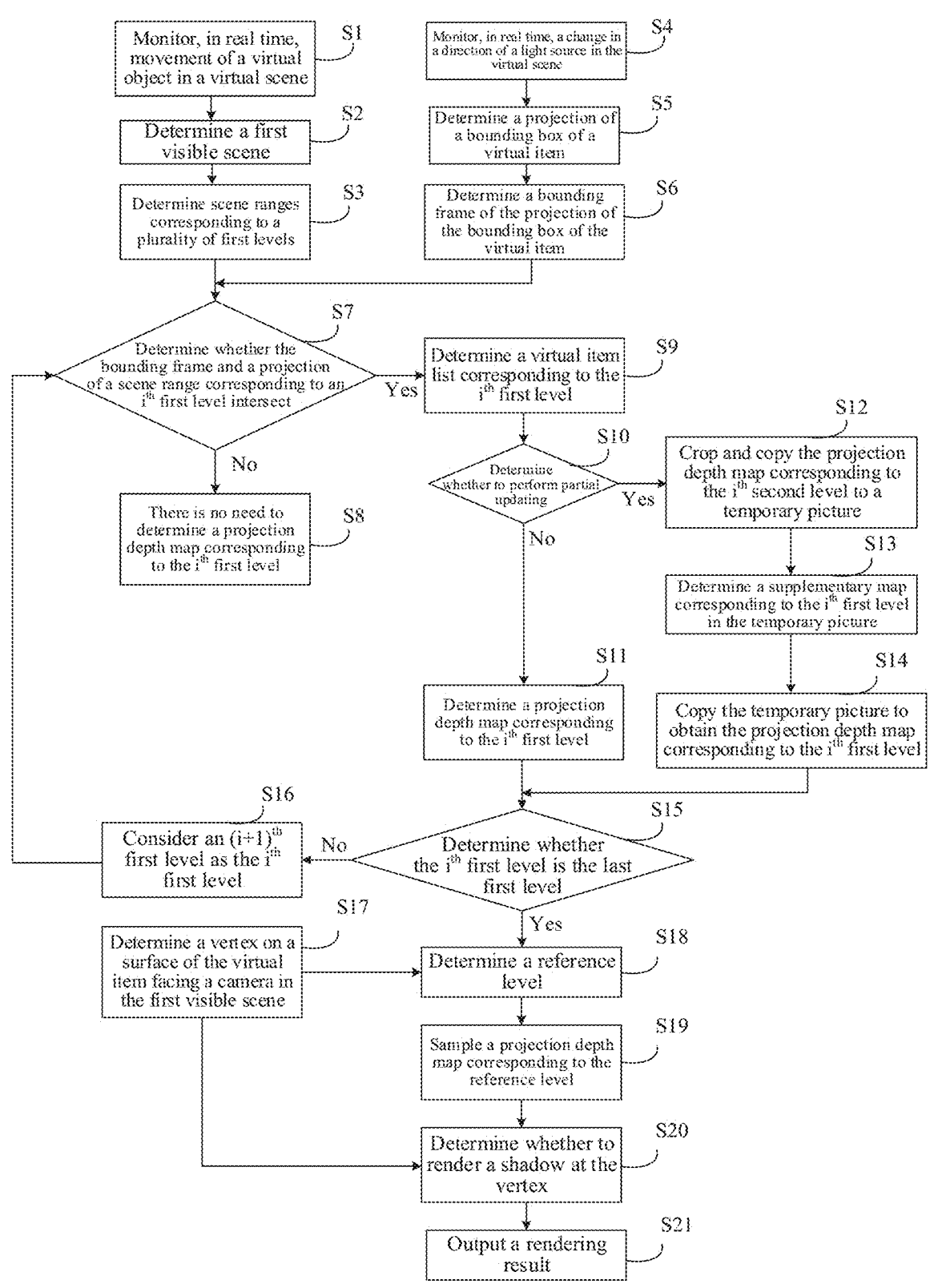
FIG. 11 is a flowchart of a method for rendering a first visible scene according to an embodiment of this application.

The foregoing describes the shadow rendering method according to the embodiments of this application from a perspective from operations of the method. The following systematically describes the method with reference to FIG. 11. Referring to FIG. 11, FIG. 11 is a flowchart of a method for rendering a first visible scene according to an embodiment of this application, and the flowchart includes S1 to S21.

S1: Monitor, in real time, movement of a virtual object in a virtual scene.

S2: Determine a first visible scene. The first visible scene is a scene after the virtual object moves, and a scene before the virtual object moves may be denoted as a second visible scene.

S3: Determine scene ranges corresponding to a plurality of first levels. The scene ranges corresponding to the first levels are obtained by dividing the first visible scene.

S4: Monitor, in real time, a change in a direction of a light source in the virtual scene.

S5: Determine a projection of a bounding box of the virtual item.

S6: Determine a bounding frame of the projection of the bounding box of the virtual item.

Then, starting from the $1^{st}$ first level of the plurality of first levels, an $i^{th}$ first level is denoted as the $i^{th}$ first level.

S7: Determine whether the bounding frame and a projection of a scene range corresponding to the $i^{th}$ first level intersect.

If there is no intersection, perform S8: There is no need to determine a projection depth map corresponding to the $i^{th}$ first level.

If there is an intersection, perform S9 to S14.

S9: Determine a virtual item list corresponding to the $i^{th}$ first level. The virtual item list corresponding to the $i^{th}$ first level includes first virtual items corresponding to the $i^{th}$ first level.

S10: Determine whether to perform partial updating. Whether to perform partial updating means whether the projection depth map corresponding to the $i^{th}$ first level is partially updated.

If partial updating is not required, perform S11: Determine the projection depth map corresponding to the $i^{th}$ first level. The projection depth map corresponding to the $i^{th}$ first level is directly determined based on the virtual item list corresponding to the $i^{th}$ first level.

If partial updating is required, perform S12 to S14.

S12: Crop and copy the projection depth map corresponding to the $i^{th}$ first level to a temporary picture.

S13: Determine a supplementary map corresponding to the $i^{th}$ first level in the temporary picture, so that the temporary picture includes a map obtained by splicing a cropped projection depth map and the supplementary map corresponding to the $i^{th}$ first level. In S13, second virtual items corresponding to the $i^{th}$ first level are determined from the virtual item list corresponding to the $i^{th}$ first level, and the supplemental map corresponding to the $i^{th}$ first level in the temporary picture is determined based on the second virtual items corresponding to the $i^{th}$ first level.

S14: Copy the temporary picture to obtain the projection depth map corresponding to the $i^{th}$ first level.

Then, after S11 or S14 is performed, perform S15: Determine whether the $i^{th}$ first level is the last first level.

If the $i^{th}$ first level is not the last first level, performed S16: Consider an $(i+1)^{th}$ first level as the $i^{th}$ first level. Then, perform a loop starting from S7 until the $i^{th}$ first level is the last first level.

If the $i^{th}$ first level is the last first level, the loop ends, and projection depth maps corresponding to the first levels may be obtained.

Then, perform S17: Determine a vertex on a surface of the virtual item facing a camera in the first visible scene.

S18: Determine a reference level. The reference level is one of the plurality of first levels.

S19: Sample a projection depth map corresponding to the reference level.

S20: Determine whether to render a shadow at the vertex. In S20, whether to render the shadow at the vertex is determined based on the projection depth map corresponding to the reference level and the vertex on the surface of the virtual item facing the camera in the first visible scene.

S21: Output a rendering result. If the determination result is rendering the shadow at the vertex, the rendering result is rendering the shadow at the vertex; or if the determination result is not rendering the shadow at the vertex, the rendering result is rendering illumination at the vertex.

Through the foregoing manner, the shadow in the first visible scene can be rendered. In this embodiment of this application, during running of the virtual scene, the projection depth maps corresponding to the first levels are determined in real time according to the movement of the virtual object in the virtual scene, so that occupation of storage resources can be reduced and shadow rendering performance can be improved. The shadows in the first visible scene is rendered by using the projection depth maps corresponding to the first levels, which helps improve a presentation effect of the shadows, supports a larger range of high-quality shadow effects, and provides strong support for making large world scenes.

In this embodiment of this application, shadows in the first visible scene are respectively rendered by using two shadow rendering solutions in the related art and the shadow rendering solution shown in FIG. 11, to obtain statistical data shown in Table 1 below. Shadow Map and Cascaded Shadow Map (CSM) are the two shadow rendering solutions in the related art, and Shadow Cache is the shadow rendering solution shown in FIG. 11.

TABLE 1

| Solution | Sight distance (meter) | Draw call | Frame rate (per second) |
| --- | --- | --- | --- |
| Shadow Map | 100 | 1312 | 180 |
| CSM | 200 | 2564 | 160 |
| Shadow Cache | 2000 | 1023 | 210 |

It can be learned from Table 1 that, the Shadow Cache has a larger sight distance, a smaller quantity of draw calls, and a higher frame rate. Therefore, the shadow rendering solution shown in FIG. 11 has better rendering performance, and can support full scene shadow rendering with a far sight distance in a large world scene.

Figure 12:
FIG. 12 is a schematic diagram of a first visible scene without shadows according to an embodiment of this application.
Figure 13:
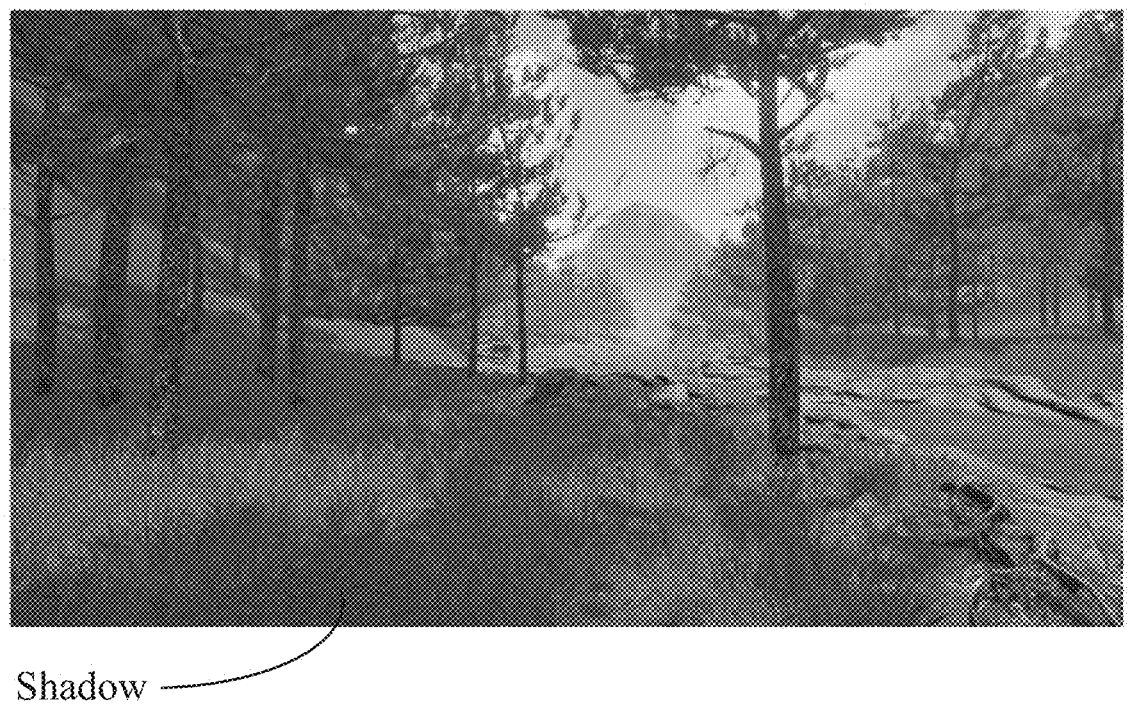
FIG. 13 is a schematic diagram of a first visible scene with shadows according to an embodiment of this application.

Referring to FIG. 12 and FIG. 13, FIG. 12 is a schematic diagram of a first visible scene without shadows according to an embodiment of this application, and FIG. 13 is a schematic diagram of a first visible scene with shadows according to an embodiment of this application. FIG. 13 is obtained through rendering according to the shadow rendering solution shown in FIG. 11. It can be learned from FIG. 12 and FIG. 13 that, in this embodiment of this application, shadows may be rendered in the first visible scene to improve fidelity of the first visible scene.

Because the embodiments of this application have advantages of a smaller calculation amount and fewer storage resources required, the embodiments of this application can reduce performance overheads of a central processing unit (CPU) and a graphics processing unit, have broad hardware compatibility, are applicable to hardware devices having a GPU, such as a computer, a mobile phone, and a game console, and have low requirements on the hardware devices.

FIG. 14 is a schematic structural diagram of a shadow rendering apparatus according to an embodiment of this application. As shown in FIG. 14, the apparatus includes:

a determining module 1401, configured to determine scene ranges corresponding to a plurality of first levels, the scene range corresponding to the first level being a range of a first visible scene included in a virtual scene or a partial range of the first visible scene, the determining module 1401 being further configured to determine, for any one of the plurality of first levels, a first virtual item corresponding to the first level based on a scene range corresponding to the first level, the first virtual item corresponding to the first level being a virtual item whose shadow is in the scene range corresponding to the first level; and the determining module 1401 being further configured to determine a first projection depth map corresponding to the first level based on the first virtual item, the first projection depth map being configured for describing distances between a plurality of first vertices and a light source, the plurality of first vertices being each a vertex on a surface of the first virtual item facing the light source; and a rendering module 1402, configured to render the shadow in the first visible scene based on the first projection depth map.

In a possible implementation, the determining module 1401 is configured to determine the scene ranges corresponding to the plurality of first levels in response to a shadow update condition being satisfied.

That the shadow update condition is satisfied includes at least one of the following: a virtual object moves in the virtual scene; illumination of the virtual scene changes; or the virtual scene is initialized.

In a possible implementation, the apparatus further includes:

an obtaining module, configured to obtain movement information of a virtual object and scene ranges corresponding to a plurality of second levels when the virtual object moves in the virtual scene, the scene range corresponding to the second level being a range of a second visible scene included in the virtual scene or a partial range in the second visible scene, the first visible scene being a visible scene after the virtual object moves, and the second visible scene being a visible scene before the virtual object moves.

The determining module 1401 is further configured to determine, for any second level, a second movement amplitude of the virtual object relative to the second level based on the movement information of the virtual object and a scene range corresponding to the second level.

The determining module 1401 is further configured to determine, in response to existence of a target level in the plurality of second levels, that the shadow update condition is satisfied, a target movement amplitude of the virtual object relative to the target level being greater than a movement threshold.

In a possible implementation, the determining module 1401 is configured to: obtain range sizes of the first levels; and determine, for any first level, a scene range corresponding to the first level in the first visible scene based on a reference point of the first visible scene and the range size of the first level.

In a possible implementation, the determining module 1401 is configured to: obtain reference projection ranges of a plurality of virtual items in the virtual scene in a first projection coordinate system; determine a first projection range of the first level in the first projection coordinate system based on the scene range corresponding to the first level; and determine, for any virtual item, the virtual item as the first virtual item if the reference projection range of the virtual item and the first projection range intersect.

In a possible implementation, the apparatus further includes:

an expansion module, configured to expand the scene range corresponding to the first level based on an expansion parameter, to obtain a reference range corresponding to the first level; and a selection module, configured to select a plurality of virtual items located in the reference range.

In a possible implementation, the determining module 1401 is configured to: determine, for any virtual item, a bounding box of the virtual item; determine first projection information of the virtual item based on the bounding box, the first projection information being configured for describing a projection of the bounding box in the first projection coordinate system; and determine the reference projection range of the virtual item based on the first projection information.

In a possible implementation, the determining module 1401 is configured to: determine second projection information of the virtual item based on the first projection information, the second projection information being configured for describing a bounding frame of the projection of the bounding box in the first projection coordinate system; and determine the second projection information as the reference projection range of the virtual item.

In a possible implementation, the determining module 1401 is configured to: determine three-dimensional projection coordinates of vertices of the first virtual item in a second projection coordinate system based on three-dimensional scene coordinates of the vertices of the first virtual item in a virtual scene coordinate system; determine an adjustment coefficient based on the scene range corresponding to the first level and a resolution of the first projection depth map; adjust the three-dimensional projection coordinates of the vertices of the first virtual item based on the adjustment coefficient, to obtain adjusted three-dimensional projection coordinates of the vertices of the first virtual item; and determine the first projection depth map based on three-dimensional projection coordinates of the light source in the second projection coordinate system and the adjusted three-dimensional projection coordinates of the vertices of the first virtual item.

In a possible implementation, the determining module 1401 is configured to: adjust the three-dimensional projection coordinates of the light source based on the adjustment coefficient, to obtain adjusted three-dimensional projection coordinates of the light source; and determine the first projection depth map based on the adjusted three-dimensional projection coordinates of the light source and the adjusted three-dimensional projection coordinates of the vertices of the first virtual item.

In a possible implementation, the determining module 1401 is configured to: obtain, for any first level, in response to a related movement amplitude of a virtual object relative to a related level being greater than a movement threshold, a related projection depth map corresponding to the related level, the related level being a second level whose scene range is of a same size as a scene range corresponding to the first level, the related projection depth map being configured for describing distances between a plurality of second vertices and the light source, the plurality of second vertices being each a vertex on a surface of a third virtual item corresponding to the related level facing the light source, and the third virtual item being a virtual item whose shadow is within a scene range corresponding to the related level; and determine the first projection depth map based on the first virtual item and the related projection depth map.

In a possible implementation, the determining module 1401 is configured to: crop the related projection depth map based on the related movement amplitude, to obtain a cropped projection depth map; determining a second virtual item corresponding to the first level from the first virtual items, the second virtual item being a virtual item having a shadow within a remaining range corresponding to the first level, the remaining range being a range of a remaining scene in the scene corresponding to the first level other than the local scene corresponding to the cropped projection depth map; and determine the first projection depth map based on the second virtual item and the cropped projection depth map.

In a possible implementation, the determining module 1401 is configured to: determine a reference projection range of the first virtual item in the first projection coordinate system; determine a second projection range of the first level in the first projection coordinate system based on the remaining range; and determine the first virtual item as the second virtual item if the reference projection range of the first virtual item and the second projection range intersect.

In a possible implementation, the determining module 1401 is configured to: determine a supplementary map corresponding to the first level based on the second virtual item, the supplementary map being configured for describing distances between a plurality of third vertices and the light source, and the plurality of third vertices being each a vertex on a surface of the second virtual item facing the light source; and splice the supplementary map and the cropped projection depth map, to obtain the first projection depth map.

In a possible implementation, the determining module 1401 is further configured to determine the related projection depth map as the first projection depth map in response to the related movement amplitude being not greater than the movement threshold.

In a possible implementation, the rendering module 1402 is configured to: determine, for any fourth vertex, a first distance between the fourth vertex and the light source, the fourth vertex being a vertex on a surface of a virtual item in the first visible scene facing a camera; determine a reference level from the plurality of first levels, the fourth vertex being a vertex on a virtual item in a scene range corresponding to the reference level; determine a second distance between a first vertex corresponding to the fourth vertex and the light source from a projection depth map corresponding to the reference level; and render the shadow at a position of the fourth vertex in response to the first distance being greater than the second distance.

In the foregoing apparatus, the scene range corresponding to the first level is a partial range of a first visible scene included in a virtual scene, which is equivalent to determining the scene range corresponding to the first level according to the first visible scene in real time during running of the virtual scene. The first virtual item corresponding to the first level is determined based on the scene range corresponding to the first level, to determine the projection depth map corresponding to the first level based on the first virtual item corresponding to the first level, so that during running of the virtual scene, projection depth maps corresponding to partial ranges of the first visible scene are determined in real time. In comparison with determining and storing shadow maps of the virtual items in the virtual scene, this solution can reduce occupation of storage resources. Shadows in the first visible scene are rendered based on the projection depth maps corresponding to the partial ranges of the first visible scene. In this way, it is beneficial to improving a presentation effect of the shadows and improving fidelity of the virtual scene.

When the apparatus provided in FIG. 14 implements the functions of the apparatus, only division into the foregoing function modules is used as an example for description. In the practical application, the functions may be allocated to and completed by different function modules according to requirements. That is, an internal structure of the device is divided into different function modules, to complete all or some of the functions described above. In addition, the apparatus provided in the foregoing embodiments and the method embodiments are based on the same concept. For details of a specific implementation process, refer to the method embodiments. Details are not described herein again.

FIG. 15 shows a structural block diagram of a terminal device 1500 according to an exemplary embodiment of this application. The terminal device 1500 includes a processor 1501 and a memory 1502.

The processor 1501 may include one or more processing cores, for example, may be a 4-core processor or an 8-core processor. The processor 1501 may be implemented in at least one hardware form of a digital signal processor (DSP), a field-programmable gate array (FPGA), or a programmable logic array (PLA). The processor 1501 may alternatively include a main processor and a co-processor. The main processor is a processor configured to process data in an awake state, and is also referred to as a central processing unit (CPU). The co-processor is a low-power-consumption processor configured to process data in a standby state. In some embodiments, the processor 1501 may be integrated with a graphics processing unit (GPU). The GPU is configured to render and draw content that needs to be displayed on a display screen. In some embodiments, the processor 1501 may further include an artificial intelligence (AI) processor. The AI processor is configured to process computing operations related to machine learning.

The memory 1502 may include one or more computer-readable storage media. The computer-readable storage medium may be non-transient. The memory 1502 may further include a high-speed random access memory, and may also include a non-volatile memory, for example, one or more magnetic disk storage devices or flash memory storage devices. In some embodiments, the non-transient computer-readable storage medium in the memory 1502 is configured to store at least one computer program. The at least one computer program is configured to be executed by the processor 1501 to perform the shadow rendering method provided in the method embodiments in this application.

In some embodiments, the terminal device 1500 further includes a display screen 1505.

The display screen 1505 is configured to display a user interface (UI). The UI may include a graph, a text, an icon, a video, or any combination thereof. When the display screen 1505 is a touch display screen, the display screen 1505 further has a capability of collecting a touch signal on or above a surface of the display screen 1505. The touch signal may be inputted to the processor 1501 as a control signal for processing. The display screen 1505 may be further configured to provide a virtual button and/or a virtual keyboard, which are/is also referred to as a soft button and/or a soft keyboard. In some embodiments, there may be one display screen 1505, disposed on a front panel of the terminal device 1500. In some other embodiments, there may be at least two display screens 1505, disposed on different surfaces of the terminal device 1500 respectively or in a foldable design. In some more embodiments, the display screen 1505 may be a flexible display screen, disposed on a curved surface or a foldable surface of the terminal device 1500. Even, the display screen 1505 may be further set in a non-rectangular irregular pattern, that is, may be a special-shaped screen. The display screen 1505 may be made of a material such as a liquid crystal display (LCD) or an organic light-emitting diode (OLED). For example, a first visible scene, a shadow in the first visible scene, and the like are displayed through the display screen 1505.

A person skilled in the art may understand that the structure shown in FIG. 15 constitutes no limitation to the terminal device 1500, and the terminal device 1500 may include more or fewer components than those shown in the figure, or some components may be combined, or a different component deployment may be used.

FIG. 16 is a schematic structural diagram of a server according to an embodiment of this application. The server 1600 may vary greatly due to different configurations or performance, and may include one or more processors 1601 and one or more memories 1602. The one or more memories 1602 store at least one computer program. The at least one computer program is loaded and executed by the one or more processors 1601 to implement the shadow rendering method provided in the foregoing method embodiments. For example, the processor 1601 is a CPU. It is clear that the server 1600 may further have components such as a wired or wireless network interface, a keyboard, an input/output interface for input and output. The server 1600 may further include other components configured to implement device functions. Details are not described herein.

According to an exemplary embodiment, a non-transitory computer-readable storage medium is further provided, having at least one computer program stored therein, and the at least one computer program being loaded and executed by a processor, to cause an electronic device to implement the shadow rendering method according to any one of the foregoing aspects.

In some embodiments, the non-volatile computer-readable storage medium may be a read-only memory (ROM), a random access memory (RAM), a compact disc read-only memory (CD-ROM), a magnetic tape, a floppy disk, an optical data storage device, or the like.

According to an exemplary embodiment, a computer program is further provided, there being at least one computer program, and the at least one computer program being loaded and executed by a processor, to cause an electronic device to implement any foregoing shadow rendering method.

According to an exemplary embodiment, a computer program product is further provided, having at least one computer program stored therein, and the at least one computer program being loaded and executed by a processor, to cause an electronic device to implement any foregoing shadow rendering method.

"A plurality of" mentioned in this specification means two or more than two. "And/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

The sequence numbers of the foregoing embodiments of this application are merely for description purposes, and do not indicate the preference of the embodiments.

The term "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module. The foregoing descriptions are merely exemplary embodiments of this application, but are not intended to limit this application. Any modification, equivalent replacement, or improvement made within the principle of this application shall fall within the protection scope of this application.

What is claimed is:

1. A shadow rendering method performed by an electronic device, the method comprising: determining scene ranges corresponding to a plurality of first levels, each scene range being a first visible scene range of a virtual scene corresponding to a respective one of the plurality of first levels; for a respective one of the plurality of first levels: determining a first virtual item whose shadow is present in a first visible scene range corresponding to the first level, further including: obtaining reference projection ranges of a plurality of virtual items in the virtual scene in a first projection coordinate system; determining a first projection range of the first level in the first projection coordinate system based on the scene range corresponding to the first level; and determining a virtual item as the first virtual item when the reference projection range of the virtual item and the first projection range intersect; determining a first projection depth map corresponding to the first level based on the first virtual item, the first projection depth map being configured for describing distances between a light source and a plurality of first vertices on a surface of the first virtual item facing the light source; and rendering the shadow of the first virtual item in the first visible scene range based on the first projection depth map.

2. The method according to claim 1, wherein the determining scene ranges corresponding to a plurality of first levels comprises:

determining the scene ranges corresponding to the plurality of first levels in response to a shadow update condition being satisfied; and the shadow update condition being satisfied comprises at least one of the following:

a virtual object moves in the virtual scene; illumination of the virtual scene changes; and the virtual scene is initialized.

3. The method according to claim 1, wherein the determining scene ranges corresponding to a plurality of first levels comprises:

obtaining a range size of each first level; and determining, for any first level, a scene range corresponding to the first level in the first visible scene based on a reference point of the first visible scene and the range size of the first level.

4. The method according to claim 1, wherein the method further comprises: before obtaining the reference projection ranges of the plurality of virtual items in the virtual scene in the first projection coordinate system: expanding the scene range corresponding to the first level based on an expansion parameter, to obtain a reference range corresponding to the first level; and selecting a plurality of virtual items located in the reference range.

5. The method according to claim 1, wherein the determining a first projection depth map corresponding to the first level based on the first virtual item comprising:

determining three-dimensional projection coordinates of vertices of the first virtual item in a second projection coordinate system based on three-dimensional scene coordinates of the vertices of the first virtual item in a virtual scene coordinate system;

determining an adjustment coefficient based on the scene range corresponding to the first level and a resolution of the first projection depth map;

adjusting the three-dimensional projection coordinates of the vertices of the first virtual item based on the adjustment coefficient, to obtain adjusted three-dimensional projection coordinates of the vertices of the first virtual item; and determining the first projection depth map based on three-dimensional projection coordinates of the light source in the second projection coordinate system and the adjusted three-dimensional projection coordinates of the vertices of the first virtual item.

6. The method according to claim 1, wherein the determining a first projection depth map corresponding to the first level based on the first virtual item comprises:

obtaining, for any first level, in response to a related movement amplitude of a virtual object relative to a related level being greater than a movement threshold, a related projection depth map corresponding to the related level, the related level being a second level whose scene range is of a same size as a scene range corresponding to the first level, the related projection depth map being configured for describing distances between a plurality of second vertices and the light source, the plurality of second vertices being each a vertex on a surface of a third virtual item corresponding to the related level facing the light source, and the third virtual item being a virtual item whose shadow is within a scene range corresponding to the related level; and determining the first projection depth map based on the first virtual item and the related projection depth map.

7. The method according to claim 1, wherein the rendering the shadow of the first virtual item in the first visible scene range based on the first projection depth map comprises:

determining a first distance between the light source and each of a plurality of candidate vertexes on a surface of a virtual item in the first visible scene facing a camera;

determining, from the plurality of first levels, a reference level corresponding to each candidate vertex;

determining, among the plurality of candidate vertexes, a second distance between the light source and a first vertex from a projection depth map corresponding to the reference level corresponding to the first vertex; and rendering the shadow at a position of each of the plurality of vertexes in response to the first distance of the candidate being greater than the second distance.

8. An electronic device, comprising a processor and a memory, the memory storing at least one computer program, and the at least one computer program, when loaded and executed by the processor, causing the electronic device to implement a shadow rendering met hod including: determining scene ranges corresponding to a plurality of first levels, each scene range being a first visible scene range of a virtual scene corresponding to a respective one of the plurality of first levels; for a respective one of the plurality of first levels: determining a first virtual item whose shadow is present in a first visible scene range corresponding to the first level, further including: obtaining reference projection ranges of a plurality of virtual items in the virtual scene in a first projection coordinate system; determining a first projection range of the first level in the first projection coordinate system based on the scene range corresponding to the first level; and determining a virtual item as the first virtual item when the reference projection range of the virtual item and the first projection range intersect; determining a first projection depth map corresponding to the first level based on the first virtual item, the first projection depth map being configured for describing distances between a light source and a plurality of first vertices on a surface of the first virtual item facing the light source; and rendering the shadow of the first virtual item in the first visible scene range based on the first projection depth map.

9. The electronic device according to claim 8, wherein the determining scene ranges corresponding to a plurality of first levels comprises:

determining the scene ranges corresponding to the plurality of first levels in response to a shadow update condition being satisfied; and the shadow update condition being satisfied comprises at least one of the following:

a virtual object moves in the virtual scene; illumination of the virtual scene changes; and the virtual scene is initialized.

10. The electronic device according to claim 8, wherein the determining scene ranges corresponding to a plurality of first levels comprises:

obtaining a range size of each first level; and determining, for any first level, a scene range corresponding to the first level in the first visible scene based on a reference point of the first visible scene and the range size of the first level.

11. The electronic device according to claim 8, wherein the determining a first projection depth map corresponding to the first level based on the first virtual item comprising:

determining three-dimensional projection coordinates of vertices of the first virtual item in a second projection coordinate system based on three-dimensional scene coordinates of the vertices of the first virtual item in a virtual scene coordinate system;

determining an adjustment coefficient based on the scene range corresponding to the first level and a resolution of the first projection depth map;

adjusting the three-dimensional projection coordinates of the vertices of the first virtual item based on the adjustment coefficient, to obtain adjusted three-dimensional projection coordinates of the vertices of the first virtual item; and determining the first projection depth map based on three-dimensional projection coordinates of the light source in the second projection coordinate system and the adjusted three-dimensional projection coordinates of the vertices of the first virtual item.

12. The electronic device according to claim 8, wherein the determining a first projection depth map corresponding to the first level based on the first virtual item comprises:

obtaining, for any first level, in response to a related movement amplitude of a virtual object relative to a related level being greater than a movement threshold, a related projection depth map corresponding to the related level, the related level being a second level whose scene range is of a same size as a scene range corresponding to the first level, the related projection depth map being configured for describing distances between a plurality of second vertices and the light source, the plurality of second vertices being each a vertex on a surface of a third virtual item corresponding to the related level facing the light source, and the third virtual item being a virtual item whose shadow is within a scene range corresponding to the related level; and determining the first projection depth map based on the first virtual item and the related projection depth map.

13. The electronic device according to claim 8, wherein the rendering the shadow of the first virtual item in the first visible scene range based on the first projection depth map comprises:

determining a first distance between the light source and each of a plurality of candidate vertexes on a surface of a virtual item in the first visible scene facing a camera;

determining, from the plurality of first levels, a reference level corresponding to each candidate vertex;

determining, among the plurality of candidate vertexes, a second distance between the light source and a first vertex from a projection depth map corresponding to the reference level corresponding to the first vertex; and rendering the shadow at a position of each of the plurality of vertexes in response to the first distance of the candidate being greater than the second distance.

14. A non-transitory computer-readable storage medium, having at least one computer program stored therein, and the at least one computer program, when loaded and executed by a processor of an electronic device, cause the electronic device to implement a shadow rendering method including: determining scene ranges corresponding to a plurality of first levels, each scene range being a first visible scene range of a virtual scene corresponding to a respective one of the plurality of first levels; for a respective one of the plurality of first levels: determining a first virtual item whose shadow is present in a first visible scene range corresponding to the first level, further including: obtaining reference projection ranges of a plurality of virtual items in the virtual scene in a first projection coordinate system; determining a first projection range of the first level in the first projection coordinate system based on the scene range corresponding to the first level; and determining a virtual item as the first virtual item when the reference projection range of the virtual item and the first projection range intersect; determining a first projection depth map corresponding to the first level based on the first virtual item, the first projection depth map being configured for describing distances between a light source and a plurality of first vertices on a surface of the first virtual item facing the light source; and rendering the shadow of the first virtual item in the first visible scene range based on the first projection depth map.

15. The non-transitory computer-readable storage medium according to claim 14, wherein the determining a first projection depth map corresponding to the first level based on the first virtual item comprising:

determining three-dimensional projection coordinates of vertices of the first virtual item in a second projection coordinate system based on three-dimensional scene coordinates of the vertices of the first virtual item in a virtual scene coordinate system;

determining an adjustment coefficient based on the scene range corresponding to the first level and a resolution of the first projection depth map;

adjusting the three-dimensional projection coordinates of the vertices of the first virtual item based on the adjustment coefficient, to obtain adjusted three-dimensional projection coordinates of the vertices of the first virtual item; and determining the first projection depth map based on three-dimensional projection coordinates of the light source in the second projection coordinate system and the adjusted three-dimensional projection coordinates of the vertices of the first virtual item.

16. The non-transitory computer-readable storage medium according to claim 14, wherein the determining a first projection depth map corresponding to the first level based on the first virtual item comprises:

obtaining, for any first level, in response to a related movement amplitude of a virtual object relative to a related level being greater than a movement threshold, a related projection depth map corresponding to the related level, the related level being a second level whose scene range is of a same size as a scene range corresponding to the first level, the related projection depth map being configured for describing distances between a plurality of second vertices and the light source, the plurality of second vertices being each a vertex on a surface of a third virtual item corresponding to the related level facing the light source, and the third virtual item being a virtual item whose shadow is within a scene range corresponding to the related level; and determining the first projection depth map based on the first virtual item and the related projection depth map.

17. The non-transitory computer-readable storage medium according to claim 14, wherein the rendering the shadow of the first virtual item in the first visible scene range based on the first projection depth map comprises:

determining a first distance between the light source and each of a plurality of candidate vertexes on a surface of a virtual item in the first visible scene facing a camera;

determining, from the plurality of first levels, a reference level corresponding to each candidate vertex;

determining, among the plurality of candidate vertexes, a second distance between the light source and a first vertex from a projection depth map corresponding to the reference level corresponding to the first vertex; and rendering the shadow at a position of each of the plurality of vertexes in response to the first distance of the candidate being greater than the second distance.

* * * * *